US012198263B2

(12) United States Patent
Dhaliwal et al.

(10) Patent No.: US 12,198,263 B2
(45) Date of Patent: Jan. 14, 2025

(54) VISUALIZATION SYSTEM FOR CREATING A MIXED REALITY GAMING ENVIRONMENT

(71) Applicant: Aristocrat Technologies Australia Pty Limited, North Ryde (AU)

(72) Inventors: Upinder Dhaliwal, Sydney (AU); Eric Droukas, Las Vegas, NV (US); Patrick Petrella, III, Las Vegas, NV (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 26 days.

(21) Appl. No.: 17/957,911

(22) Filed: Sep. 30, 2022

(65) Prior Publication Data
US 2023/0281915 A1  Sep. 7, 2023

Related U.S. Application Data

(60) Provisional application No. 63/316,840, filed on Mar. 4, 2022.

(51) Int. Cl.
*G06T 15/20* (2011.01)
*G06T 15/04* (2011.01)
(Continued)

(52) U.S. Cl.
CPC ............ *G06T 15/205* (2013.01); *G06T 15/04* (2013.01); *G06T 19/006* (2013.01); *G06T 19/20* (2013.01);
(Continued)

(58) Field of Classification Search
CPC ..... G06T 15/205; G06T 19/006; G06T 19/20; G06T 2200/24; G06T 2215/16;
(Continued)

(56) References Cited

U.S. PATENT DOCUMENTS 9,940,751 B1 * 4/2018 Wagner ..................... G06T 3/40
2012/0056992 A1 * 3/2012 Kuroda ................. G06T 19/006
348/46

(Continued)

OTHER PUBLICATIONS

Office Action (Non-Final Rejection) dated Jan. 5, 2024 for U.S. Appl. No. 17/957,865 (pp. 1-13).
Office Action (Final Rejection) dated Jul. 16, 2024 for U.S. Appl. No. 17/957,865 (pp. 1-13).

*Primary Examiner* — Jeffery A Brier
(74) *Attorney, Agent, or Firm* — Blank Rome LLP

(57) ABSTRACT

Determining a fit of a real-world electronic gaming machine (EGM) using a virtual representation of an EGM includes obtaining the virtual representation, obtaining sensor data for a real-world environment in which the virtual representation is to be presented, and detecting one or more surfaces in the real-world environment based on the sensor data. A determination is made that the virtual representation of the electronic gaming machine fits within the real-world environment in accordance with the real-world dimensions and the detected one or more surfaces. The virtual representation is presented in a mixed reality environment such that the virtual representation is blended into a view of a real-world environment along the one or more surfaces.

20 Claims, 24 Drawing Sheets

(51) Int. Cl.
    *G06T 19/00*      (2011.01)
    *G06T 19/20*      (2011.01)
    *G07F 17/32*      (2006.01)

(52) U.S. Cl.
    CPC ........ *G07F 17/3225* (2013.01); *G07F 17/323* (2013.01); *G06T 2200/24* (2013.01); *G06T 2215/16* (2013.01); *G06T 2219/2004* (2013.01)

(58) Field of Classification Search
    CPC ............ G06T 2219/2004; G06T 15/04; G07F 17/3225; G07F 17/323; G07F 17/3211; G07F 17/3213; G07F 17/3216; G07F 17/3223; G07F 17/3227
    See application file for complete search history.

(56) References Cited

U.S. PATENT DOCUMENTS

| | | | |
|---|---|---|---|
| 2018/0374276 A1* | 12/2018 | Powers | G06T 17/205 |
| 2019/0051101 A1 | 2/2019 | Russ | |
| 2019/0228581 A1* | 7/2019 | Dascola | G06F 3/048 |
| 2021/0046383 A1* | 2/2021 | Dhaliwal | A63F 13/537 |
| 2022/0067984 A1* | 3/2022 | Choi | G07F 17/3295 |
| 2022/0130126 A1* | 4/2022 | Delgado | G06F 3/04842 |
| 2022/0327790 A1* | 10/2022 | Melling | G06N 20/00 |

\* cited by examiner

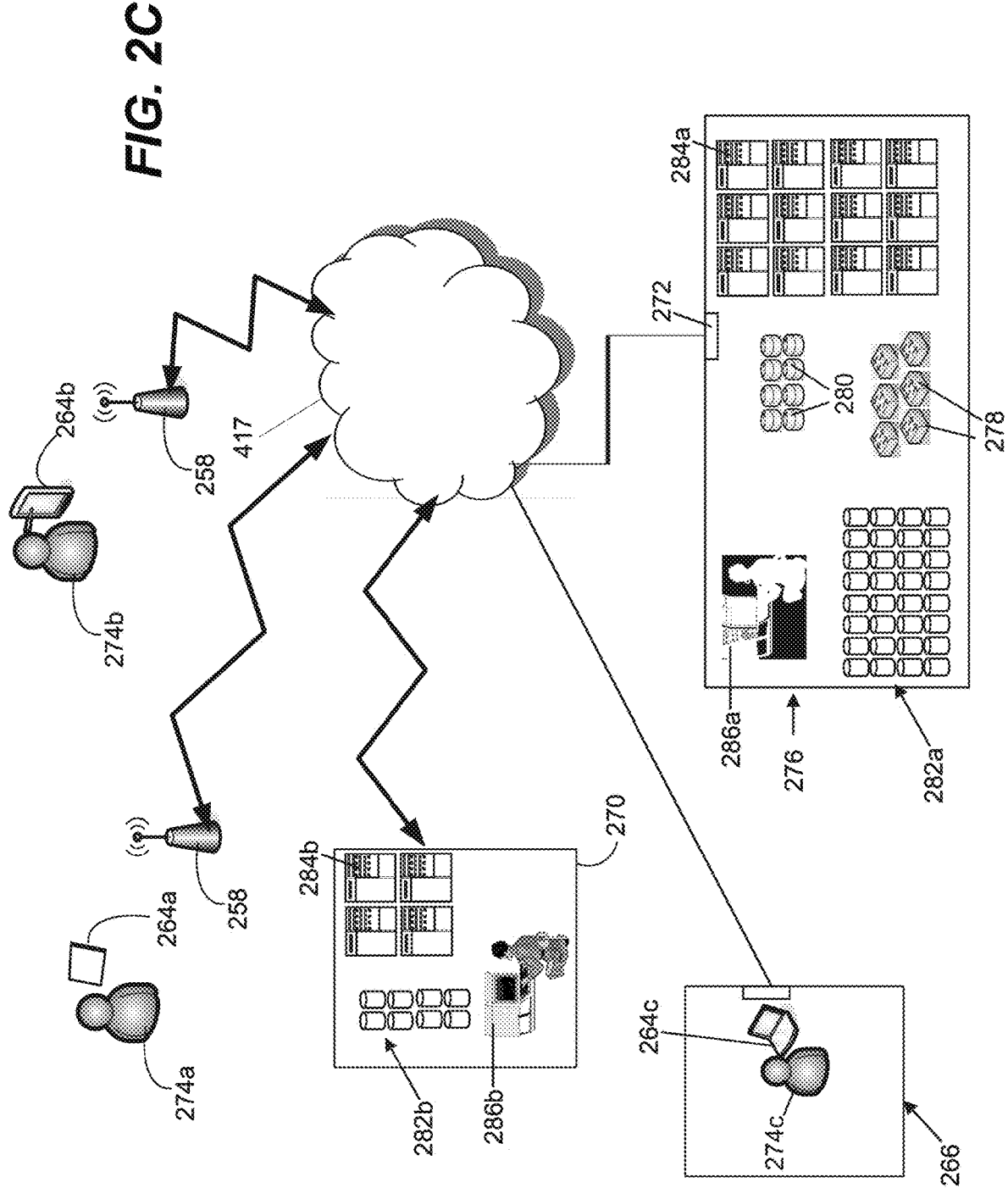

VISUALIZATION SYSTEM FOR CREATING A MIXED REALITY GAMING ENVIRONMENT

RELATED APPLICATION(S)

The present application claims priority to U.S. Provisional Patent Application No. 63/316,840, filed Mar. 4, 2022, and entitled "A VISUALIZATION SYSTEM FOR CREATING A MIXED REALITY GAMING ENVIRONMENT" which is hereby incorporated by reference in its entirety.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

Typically, multiple EGMs of different types and/or that implement different games are disposed on a gaming area managed for example by a casino operator, and the casino operator selects the EGMs, the games that are implemented and the locations of the EGMs on the gaming area according to defined criteria.

SUMMARY

A mixed reality system is described as one that can be used to provide a presentation of a virtual representation of one or more EGMs, or one or more banks of EGMs, in a mixed reality environment. The mixed reality system includes computer code to present, on a user interface, selectable components corresponding to one or more wagering games. Based on user input, a selection of user selectable components is determined which correspond to an EGM configuration. A virtual representation of the EGM is generated based on the EGM configuration. The virtual representation is presented by the mixed reality system such that the virtual representation is blended into a view of a real-world environment.

In one or more embodiments, additional user inputs may be received via the user interface corresponding to configurations of one or more additional EGMs. Virtual representations for the one or more additional EGMs are generated based on the configurations. The one or more additional representations are presented in the view of the real-world environment, for example as banks of machines and/or separate machines. A spatial relationship is determined among the presented virtual representations of the EGMs. A record of the configured EGMs and the spatial relationship is stored.

In one or more embodiments, a further user interface is provided to generate a presentation order for at least a subset of the virtual representations of the EGMs. The further user interface includes a user input component which, when activated, causes the mixed reality device to present for playback the presentation order.

In one or more embodiments, the virtual representation of the EGM is associated with real-world geometric characteristics. User input is received via the mixed reality device to indicate a placement of the virtual representation of the EGM. The mixed reality device obtains sensor data from which one or more planes in the real-world environment are determined. A determination is made regarding whether a potential collision occurs between the visual representation of the EGM and the one or more planes in the real-world environment based on the real-world geometric characteristics of the EGM, the one or more planes, and the placement of the virtual representation of the EGM.

In some embodiments, the virtual representation of the EGM includes gaming data for the selected wagering game from a content management server. The gaming data includes visual data for the selected wagering game, and the visual data is mapped to the geometry of the virtual representation of the EGM.

In one or more implementations, each of the above-described features, and variations thereof, may be implemented as a series of computer executable instructions executed on a programmable electronic device. Such instructions may use any one or more convenient programming language. Such instructions may be collected into engines and/or programs and stored in any computer-readable medium or media that is readable and executable by a computer system, gaming device, or other programmable electronic device.

BRIEF DESCRIPTION OF THE DRAWINGS

FIG. 2C is a diagram that shows examples of components of a system for providing online gaming according to some aspects of the present disclosure.

DETAILED DESCRIPTION

Figure 1:
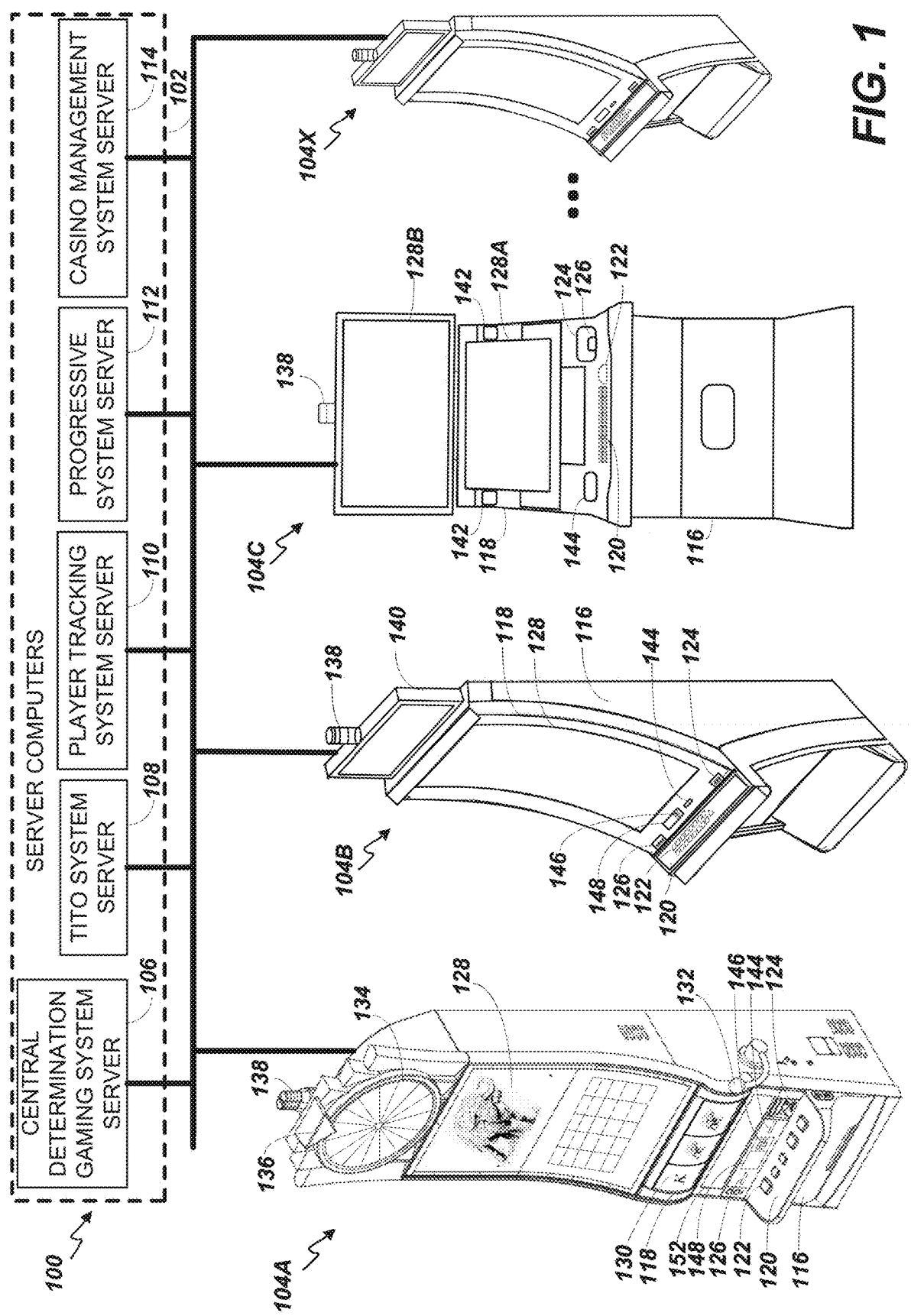
FIG. 1 is an exemplary diagram showing several EGMs networked with various gaming related servers.

The disclosure is directed to various embodiments of techniques for generating and presenting virtual representations of EGMs in a mixed reality environment. In some embodiments, a user interface is provided by which a user can select a set of configurations for one or more EGMs. Based on the selected configuration, one or more virtual representations of the EGMs are generated. The virtual representations of the EGMs are presented on a display device such that the virtual representations are blended into a view of a real-world environment. In some embodiments, the virtual representations are generated based on data from a content management server related to the particular wagering game and/or gaming hardware. Further, in some embodiments, the virtual representation is rendered by determining one or more characteristics of the real-world environment and rendering the virtual representation accordingly.

This disclosure is also related to techniques for providing a user interface to determine whether a real-world version of a generated virtual representation of an EGM would fit in a particular room. A device may collect sensor data from which one or more physical boundaries in the room are determined. The device provides a user interface in which the virtual representation of the EGM is presented. A set of geometric characteristics for a real-world version of the generated virtual representation of the EGM are determined. If the real-world version of the EGM would collide with one of the detected physical boundaries in the real-world environment, the presentation of the virtual representation of the EGM is modified accordingly.

One or more virtual representations of EGMs may be generated within a single session, and a user may use the user interface to generate a layout for the virtual representations of EGMs. For example, the layout can include multiple individual machines, a bank of machines, or a combination thereof. The resulting layout can be saved for later retrieval, for example in a local storage, in a network storage, or a combination thereof. In addition, in some embodiments, the interface may allow a user to generate a linear presentation of the generated virtual representations of EGMs for later playback.

In some embodiments, the configurations for the virtual representations are obtained from content management servers connected to real-world EGMs and, as such, the configurations and characteristics of the virtual representation of the EGM correspond to real-world characteristics of an available EGM build. As such, the disclosure addresses the challenge of providing a digital preview of an EGM prior to the EGM being built because a display of an EGM lacks real-world physical context. That is, by implementing a mixed reality technique to present virtual builds of EGMs, the technical challenge of displaying a virtual representation of an EGM without real-world context of the machine in a physical environment.

For purposes of this disclosure, the term "real-world environment" refers to a physical environment that users can sense and/or interact without the assistance of electronic devices. In other words, users can directly sense and/or interact with the physical environment using the users' senses, for example, through sight, touch, hearing, taste, and smell. A real-world environment can include, for example, real-world gaming areas, such as physical casinos, include physical objects, such as lights, building structures, gaming devices, and physical patrons.

Conversely, the term "mixed reality environment" refers to a generated virtual environment configured to integrate one or more sensory inputs from the real-world environment or representations thereof with virtual based sensory inputs, such as virtual objects. Generally, a mixed reality environment can fall anywhere between without including an entirely physical environment and a completely virtual reality environment. In some mixed reality gaming environments, virtual based sensory inputs may respond to changes in sensory inputs from the physical gaming environment.

Also, some electronic devices for presenting a mixed reality gaming environment may track a virtual object's orientation and location in relation to the real-world environment to allow for interaction with one or more physical objects. For example, a tablet computer may account for movements so that a virtual gaming device object appears stationery with respect to the physical ground plane. One example of a mixed reality environment is augmented reality.

Within this disclosure, the term "augmented reality gaming area" refers to a type of mixed reality gaming area where one or more virtual objects are superimposed over a physical gaming environment. As an example, an electronic device can present an augmented reality gaming area with a transparent or translucent display such that a user is able to view at least a portion of the physical gaming environment. The electronic device can present one or more virtual objects on the transparent or translucent display allowing a user to view the superimposed virtual objects over the physical gaming environment. In another example, the electronic device includes an opaque display and one or more imaging sensors that capture one or more images and/or frames of the physical gaming environment. The images and/or videos of the physical gaming environment are representations of the physical gaming environment that are presented on the opaque display. A user indirectly views the physical gaming environment by viewing the images and/or videos, and perceives the virtual objects superimposed over the physical gaming environment. Additionally, or alternatively, an electronic device may be a projection system that projects virtual objects into the physical gaming environment, for example, as a hologram, so that a user perceives the virtual objects superimposed over the physical gaming environment.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (Wi-Fi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino-issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
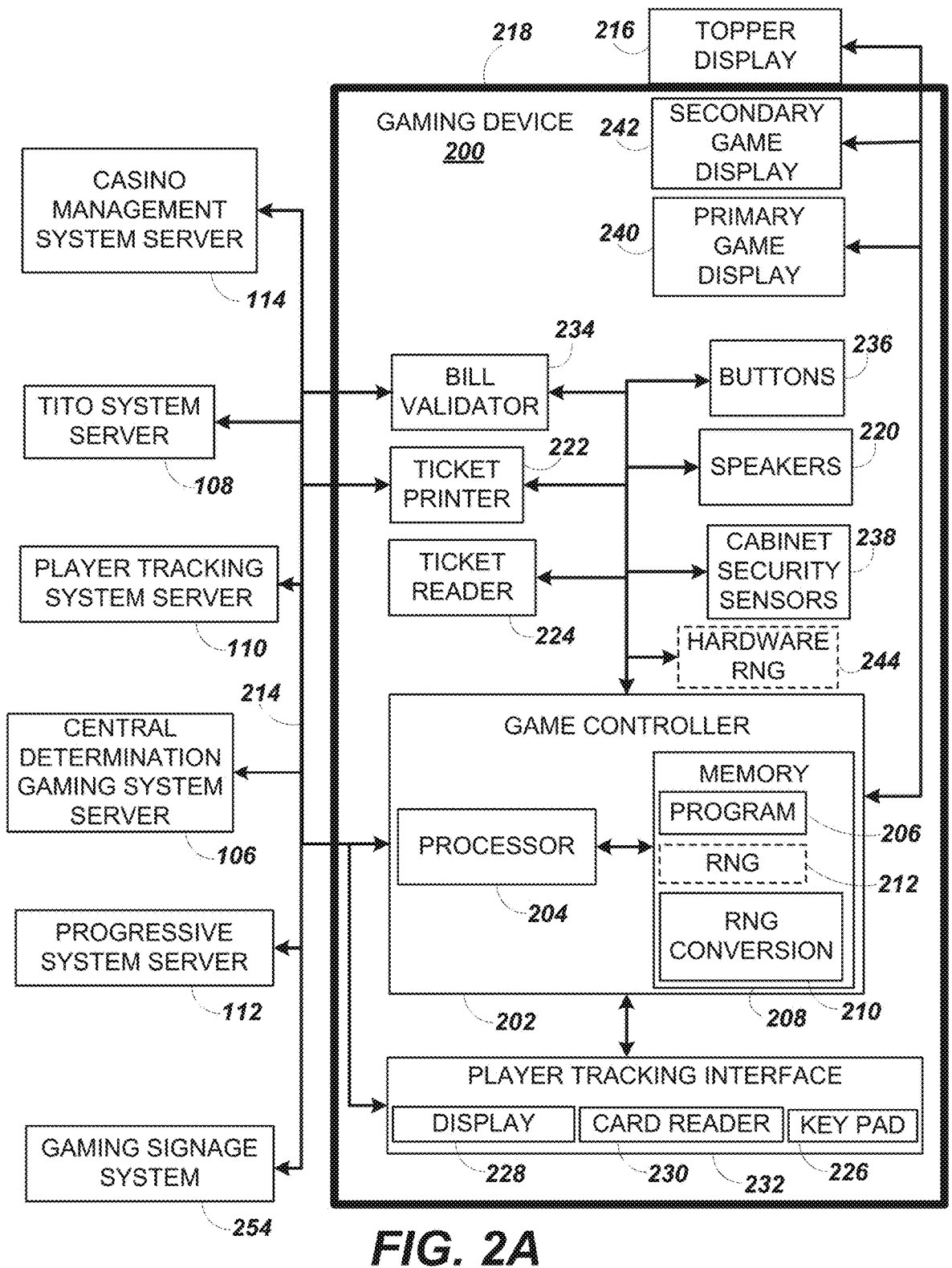
FIG. 2A is a block diagram showing various functional elements of an exemplary EGM.

Many or all the above-described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints barcoded tickets or other media or mechanisms for storing or indicating a player's credit value, a ticket reader 224 which reads barcoded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs the game outcome on one or more of the primary game display(s) 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., Wi-Fi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
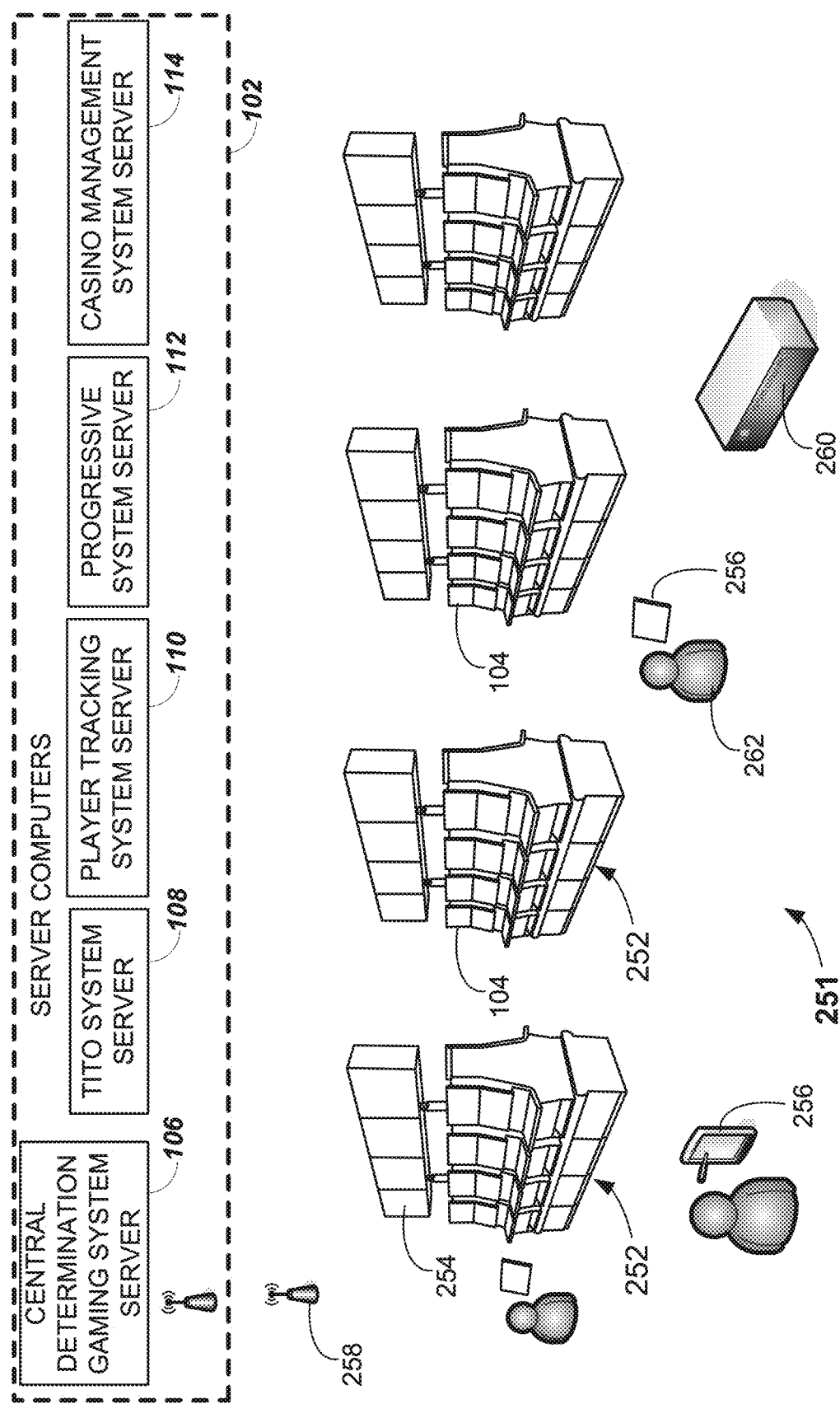
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264a, 264b and 264c are capable of communication via one or more networks 417. The networks 417 may, for example, include one or more cellular telephone networks, the Internet, etc. In this example, the EUDs 264a and 264b are mobile devices: according to this example the EUD 264a is a tablet device and the EUD 264b is a smart phone. In this implementation, the EUD 264c is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282a, servers 284a and one or more workstations 570a. The servers 284a may, for example, be configured to provide access to a library of games for online game play. In some examples, code for executing at least some of the games may initially be stored on one or more of the storage devices 282a. The code may be subsequently loaded onto a server 284a after selection by a player via an EUD and communication of that selection from the EUD via the networks 417. The server 284a onto which code for the selected game has been loaded may provide the game according to selections made by a player and indicated via the player's EUD. In other examples, code for executing at least some of the games may initially be stored on one or more of the servers 284a. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284b, storage devices 282b, and one or more workstations 286b. According to this example, the financial institution data center 270 is configured to maintain financial accounts, such as checking accounts, savings accounts, loan accounts, etc. In some implementations one or more of the authorized users 274a-274c may maintain at least one financial account with the financial institution that is serviced via the financial institution data center 270.

According to some implementations, the gaming data center 276 may be configured to provide online wagering games in which money may be won or lost. According to some such implementations, one or more of the servers 284a may be configured to monitor player credit balances, which may be expressed in game credits, in currency units, or in any other appropriate manner. In some implementations, the server(s) 284a may be configured to obtain financial credits from and/or provide financial credits to one or more financial institutions, according to a player's "cash in" selections, wagering game results and a player's "cash out" instructions. According to some such implementations, the server(s) 284a may be configured to electronically credit or debit the account of a player that is maintained by a financial institution, e.g., an account that is maintained via the financial institution data center 270. The server(s) 284a may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274a-274c), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
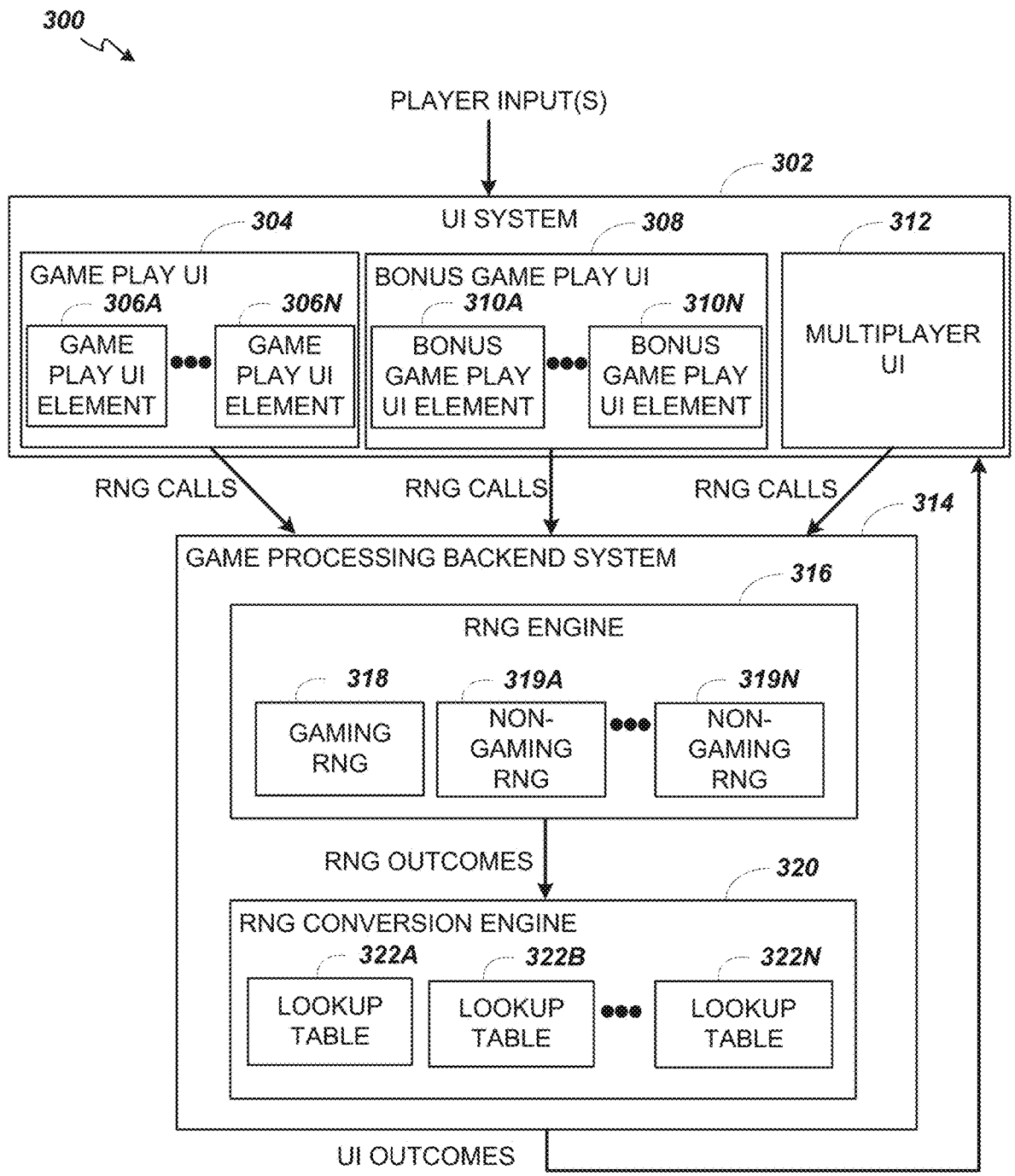
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

According to some embodiments, a user interface may be provided, for example as a part of an application, from which a user may build virtual representations of electronic gaming machines. In some embodiments, functionality is provided on a mobile device to allow a user to generate virtual representations of one or more EGMs that correspond to real-world offerings of EGMs. As such, the characteristics of the virtual representation of the EGM correspond to real-world characteristics of available EGMs for gameplay.

Figure 4:
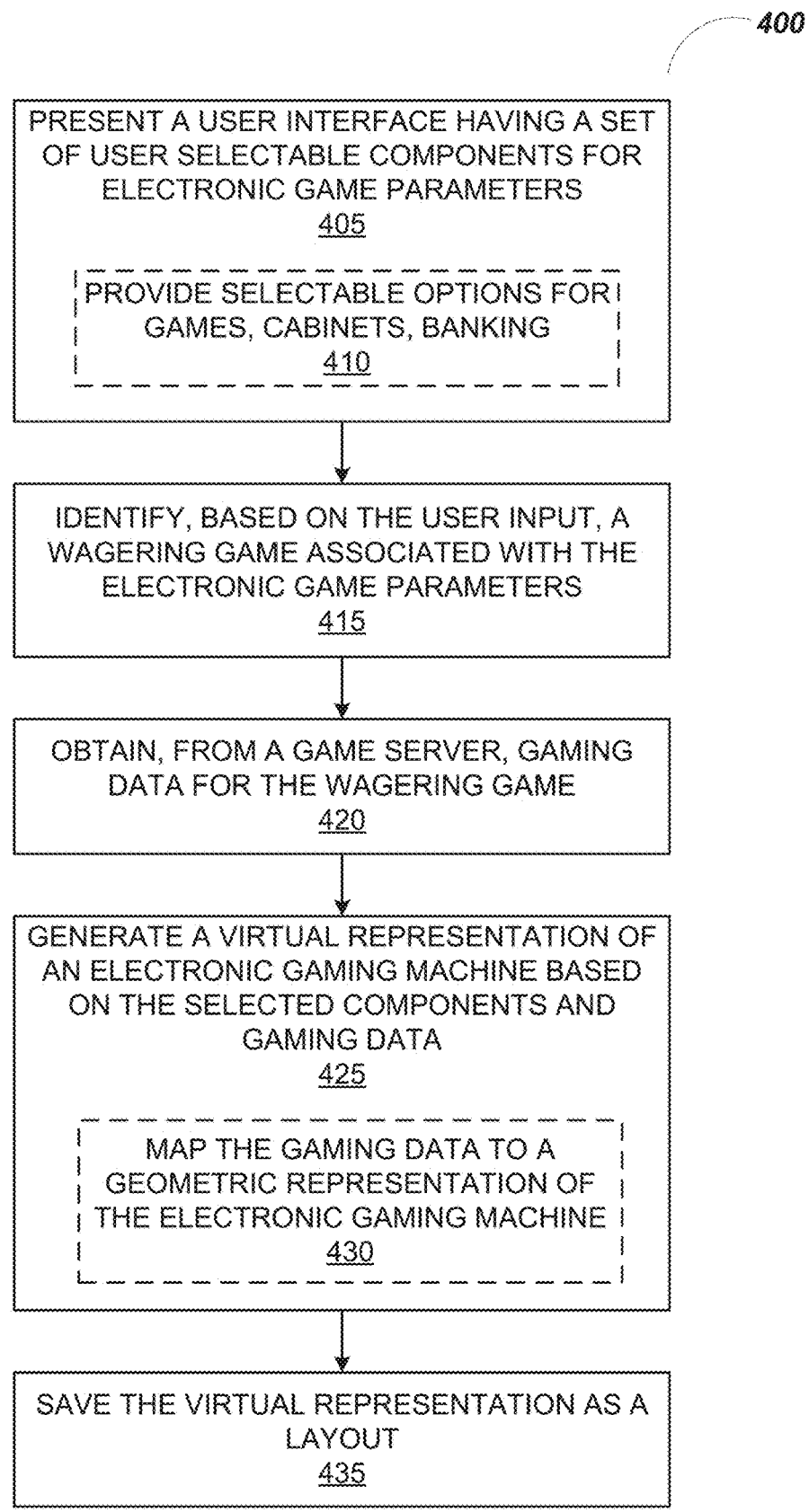
FIG. 4 depicts a flowchart of an example technique for generating a virtual representation of an electronic gaming machine, in accordance with one or more embodiments.

FIG. 4 depicts a flowchart of an example technique for generating a virtual representation of an electronic gaming machine, in accordance with one or more embodiments. The flowchart is depicted with a set of processes performed in a particular order. However, it should be understood that in certain embodiments, the various processes may be performed in a different order. Further, some processes presented in FIG. 4 may be omitted. The processes are described as being performed by particular components. However, in certain embodiments, the processes may be performed by alternative components.

Figure 5A:
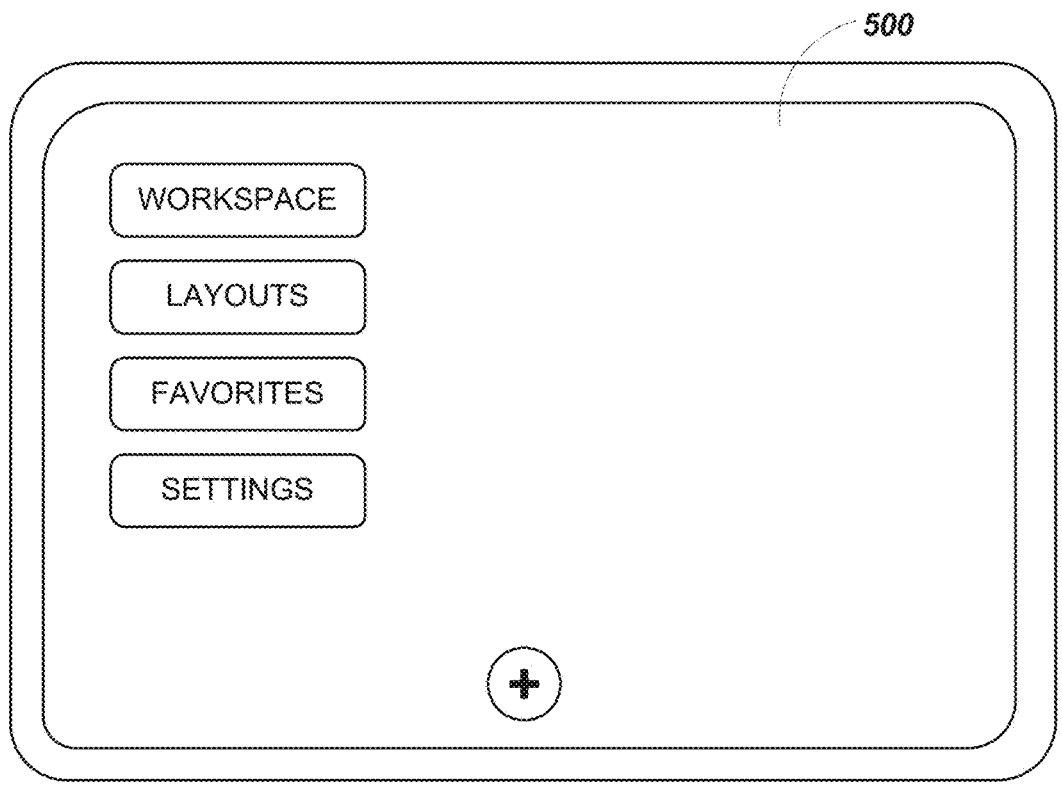
FIGS. 5A-5B depict an example cabinet building interface, in accordance with one or more embodiments.

The flowchart 400 begins at block 405, where a user interface is presented having a set of user selectable components for electronic game parameters. The user interface may be a cabinet creation interface. In some embodiments, a landing page is provided having various user input components, such as Workspace, Layouts, Favorites, and Settings, as shown at interface 500 of FIG. 5A. The landing page may include a user input component, such as the plus sign at the bottom of the screen which, when enabled, causes a cabinet creation interface to be presented. Each of these selectable components may lead to a user interface for generating representations of electronic gaming machines within various contexts (i.e., for a particular layout, predefined cabinet builds, and the like).

Optionally, at block 410, selectable options are presented for games, cabinets, banking and the like. According to some embodiments, the cabinet creation interface provides separate interfaces for each classification of the cabinet parameters. These selectable components may be presented in one or more interface panels. In some embodiments, the options provided in the interface panels will dynamically change based on user input, as will be described in greater detail below with respect to FIG. 5B. In some embodiments, additional parameters may be provided for selection, such as toppers, seating, and other accessory items to the cabinet and/or bank of cabinets.

At block 415, the wagering game is identified based on user input, which is associated with the electronic game parameters. In one or more embodiments, the wagering game may include the specific game selected for a cabinet or bank of cabinets. In some embodiments, the user interface also includes functionality to modify a cabinet and/or other hardware for the virtual representation of the EGM. The user interface may allow a user to select from various cabinets and banking systems, thereby providing the user with configuration options.

The flowchart 400 continues at block 420, where gaming data is obtained from a game server for the wagering game. The gaming data may include, for example, media to be presented on the representation of the electronic gaming device based on the wagering game, topper media, seating media, and other accessory media for presentation on accessory devices. In addition, other data regarding the wagering game may be obtained, such as a game family top which the game belongs, description information, statistics, and the like. In some embodiments, the gaming data may be obtained from a content management server.

According to one or more embodiments, the particular wagering games, hardware, configurations, and the like may be pre-loaded in a current device or may be obtained from a remove server upon request. Further, in some embodiments, a combination of storage may be utilized. For example, a particular package for some or all of the wagering games may be pre-loaded on a local device. Occasionally, or periodically, the local device may sync with a remote server to ensure that the current locally stored data is up to date. As another example, an initial set of gaming data may be locally stored. Real time data may be obtained for a particular wagering game, for example, when the user input component for the wagering game is selected by a user. The real time data may include updates to the available configurations for the wagering game, or may be limited data, such as updated art or content for the wagering game. Further, in some embodiments, the remotely stored data may not be necessary for utilizing the user interface such that the user interface maintains some or all functionality when network connectivity is unavailable.

The flowchart continues at block 425, or a virtual representation of an electronic gaming machine is generated based on the selected components and gaming data. In some embodiments, the virtual representation may include a graphical representation of the electronic gaming device that is comprised of the selected configuration. As such, the proportions of the graphical representation of the electronic gaming device may correspond to a real-world electronic gaming device. Optionally, at block 430, the gaming data is matched to geometric representation of the electronic gaming machine. In some embodiments, the selectable cabinets and/or banks may be associated with 2D or 3D data corresponding to the shape of the device. In some embodiments, the gaming data may include visual media, such as images or video, which are projected onto the geometric shape of the cabinet (or cabinets of a bank) to cause the virtual representation to appear as an operating electronic gaming machine configured for the selected wagering game. In some embodiments, the media may include pre-recorded gameplay such that the virtual representation appears to be an operating version of the wagering game on the cabinet(s).

The flowchart 400 concludes at block 435, where the user interface provides an interface for saving the virtual representation of the EGM (or bank of EGMs). In some embodiments, the virtual representation may be saved as a Layout.

Figure 5B:
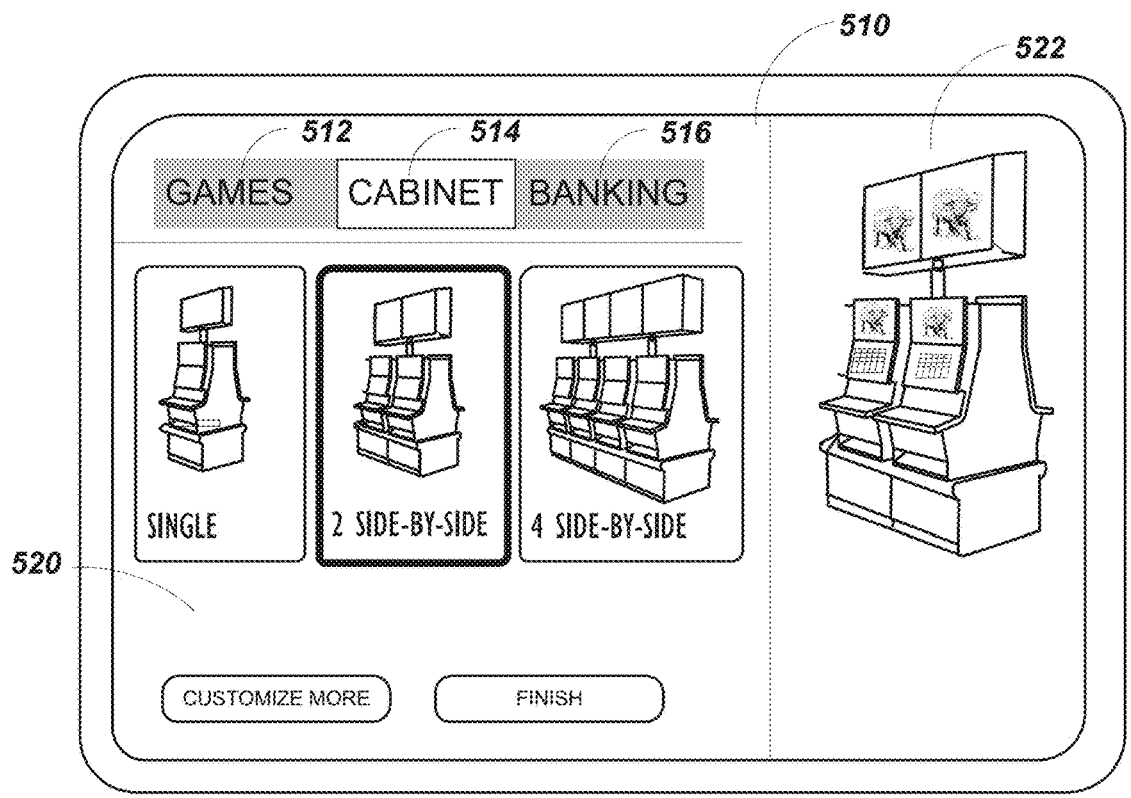

FIG. 5B depicts an example cabinet building interface, in accordance with one or more embodiments. As described above, the selectable options are presented for games, cabinets, banking and the like. According to some embodiments, the cabinet creation interface 510 provides separate interfaces for each classification of the cabinet parameters. These selectable components may be presented in one or more interface panels, as shown by selectable components 512, 514, and 516. For purposes of the example shown, a cabinet interface 520 is presented, which shows a set of optional cabinet configurations.

In some embodiments, the options provided in the interface panels will dynamically change based on user input. For example, if the user selects a particular wagering game, the cabinets provided for user selection may be reduced to only display cabinets on which the selected wagering game is available. Similarly, banking systems may be reduced based on a selected cabinet, and the like. Further, in some embodiments, if a user selection is received initially for a particular cabinet, the displayed games and/or banking systems may be reduced based on those compatible with the selected cabinet. Similarly, if a user selection is received initially for a particular banking system, the displayed games and/or cabinets may be reduced based on those compatible with the selected banking system. In some embodiments, additional configuration options may be presented for user selection.

In this example, the available cabinet configurations for a selected game are provided in cabinet interface 520. In some embodiments, the cabinet interface includes multiple panels, or regions, in which content is displayed. In this example, the cabinet interface 520 is in a first region of the display includes a panel providing user input components for user selection to allow a user to build a virtual representation of an EGM. A second panel 522 is a preview panel which displays a preview of the virtual representation of the EGM as it is built. In some embodiments, the two panels may be presented concurrently. The preview panel may be presented in conjunction with any portion of the user interface in which user selections may be made. The preview panel may include a view of the cabinet or bank of cabinets designed based on the selected configurations. In some embodiments, the preview panel may show media specific to the configuration. The media may include image data and/or audio data and may be obtained in real time from a content management server or may be pre-stored in the local device according to some embodiments. The image data may include, for example, game art or a video of game play on the cabinet(s).

The user interface may include options to select multiple wagering games, and may include an option to find one or more particular or sets of wagering games using a filtering function. As such, presentation space is optimized in the user interface by presenting the most relevant games as identified by the user on a single user display, thereby minimizing the amount of data that must be rendered for display and reducing the need for a scrolling function.

Figure 6:
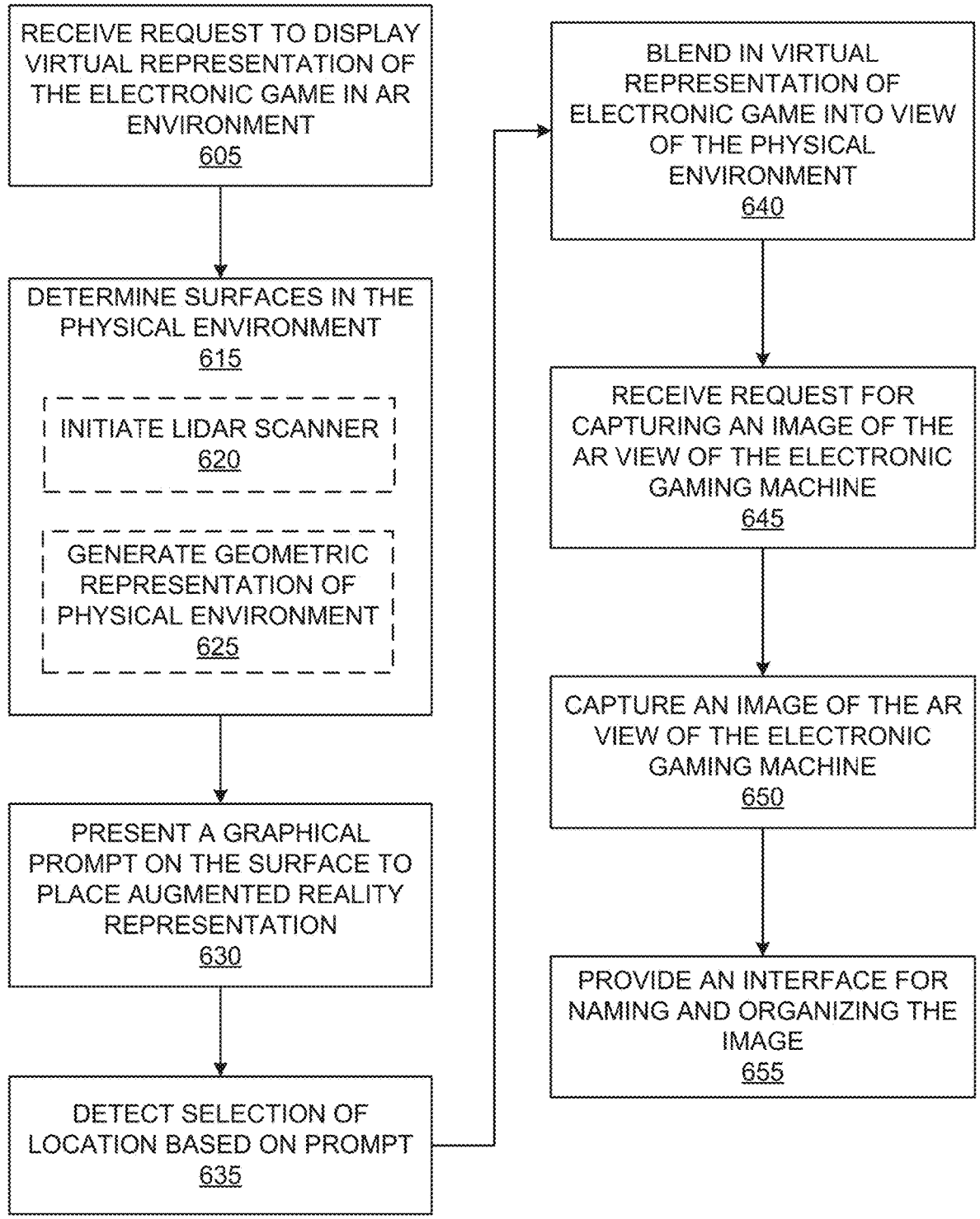
FIG. 6 depicts a flowchart of a technique for providing an augmented reality view of an electronic gaming machine, in accordance with one or more embodiments.

FIG. 6 depicts a flowchart of a technique for providing an augmented reality view of an electronic gaming machine. The flowchart is depicted with a set of processes performed in a particular order. However, it should be understood that in certain embodiments, the various processes may be performed in a different order. Further, some processes presented in FIG. 6 may be omitted. The processes are described as being performed by particular components. However, in certain embodiments, the processes may be performed by alternative components.

The flowchart 600 begins at block 605 where the device receives a request to display a virtual representation of the electronic game in an augmented reality (AR) environment. In some embodiments, the request may be received, for example, from the cabinet build interface described above with respect to FIG. 5B. Alternatively, the request may be received after a cabinet or cabinets have been built and saved for later reference from within the user interface.

The flowchart 600 continue at block 615, where surfaces are determined in the physical environment. In some embodiments, the local device can obtain geometric characteristics of the device, such as a map or other data, from which surfaces can be determined. The surfaces may include at least a floor surface on which a virtual representation of an electronic gaming machine can be placed, or may include additional surface, such as walls, tables, or other boundary information for the environment. In some embodiments, the surfaces are determined from geometric information for a particular device that is pre-stored and retrieved based on location information for the device.

Optionally, at block 620, a scan of the environment is initiated. The local device may mobile device may include sensors to detect environmental characteristics, such as LiDAR, RADAR, ambient light sensors, gyroscopic sensors, and the like. At 625, a geometric representation of the physical environment is generated. In some embodiments, the mobile device may include computer instructions to utilize the sensor data to generate a geometric representation of the real-world environment. For example, the mobile device may identify one or more planes and/or boundaries in the physical environment, and/or may generate a geometric representation of the real-world environment, for example in the form of a three-dimensional mesh.

The flowchart 600 continues at block 630 where a graphical prompt is presented on the surface to place the AR representation of the electronic gaming machine. In some embodiments, the mobile device can include an opaque display and a camera which captures image data of the real-world environment and causes the image of the real-world environment to be displayed on the opaque display. In some embodiments, the mobile device may include a transparent display, such as a see-through display through which the real-world environment is visible. Alternatively, the mobile device may include a pass-through display onto which image data of the environment is presented. The graphical prompt may be a movable preview of the virtual representation of the electronic gaming machine, or may be presented in the form of a box, a cursor, or other visual identifier, which may be moved around a view of the physical environment.

At bock 635, a selection of location is detected based on the prompt. The device may be configured to receive user input indicating a requested placement of virtual information, such as through detection of a touch on a region on the display that corresponds to a particular location on a surface in the view of the real-world environment, or another input action configured to trigger placement of the virtual representation of the electronic gaming device. In some embodiments, the UI for providing a preview of the placement may include a user input component to confirm placement of the virtual representation of the EGMs.

The flowchart 600 continues at block 640 where the representation of the electronic game is blended into the view of the physical environment. The virtual representation of the EGMs is associated with a set of geometric characteristics that correspond to real-world geometric characteristics of a real-world version EGM represented by the virtual representation. For example, a particular cabinet selected for the virtual representation of the EGM may be associated with predefined geometric characteristics, such as a 3D dimensions, a footprint, a volume, and the like. Thus, the preview of the placement may provide contextual information regarding how a physical EGM having the characteristics of the virtual representation would appear in the physical environment in a mixed reality format.

At block 645, a request is received for capturing an image of the augmented reality view of the electronic gaming machine. In particular, a user can capture an image of the EGM blended into the view of the real environment for future reference. As an example, as will be described in greater detail below with respect to FIG. 7, a selectable interface component can be presented along with the view of the virtual representation of the EMG in the view of the real environment. Additionally, or alternatively, other input mechanisms can be used to indicate a request to capture the image, such as one or a combination of digital or mechanical buttons on the mobile device, or the like. The flowchart 600 continues at block 650, where an image of the AR view of the electronic gaming machine is captured. As will be described in FIG. 9, a photo preview may be provided in response to the request.

The flowchart 600 concludes at block 655 where an interface is provided for naming and organizing the image. In some embodiments, the image may be stored in accordance with a pre-existing layout (such as a layout of EGMs from which the AR view was generated). In addition, the image may be stored in association with a particular portfolio, or other set of data.

Figure 7A:
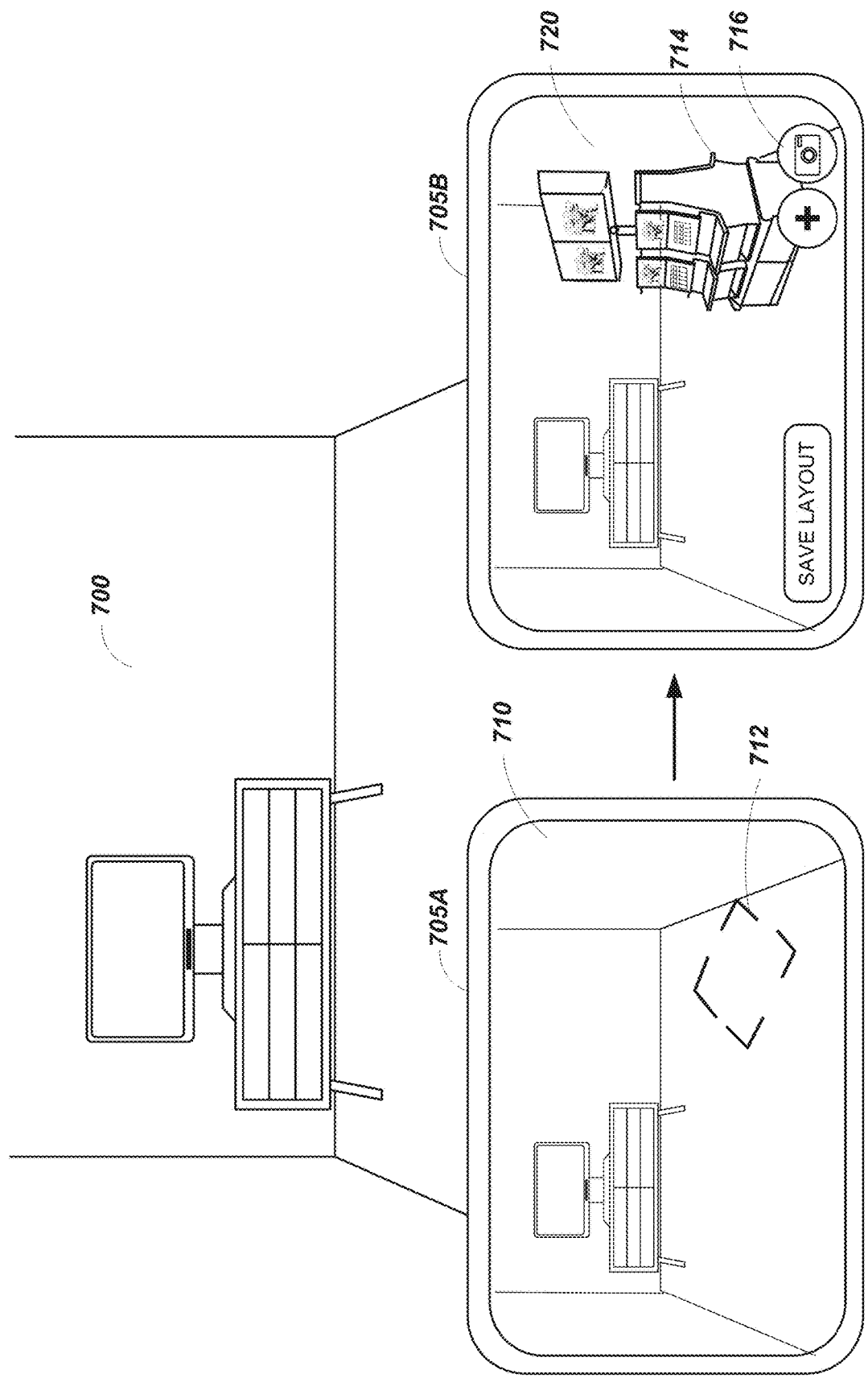
FIGS. 7A-7B depict example diagrams of a user interface for viewing a virtual representation of an EGM in a physical environment, in accordance with one or more embodiments.

FIG. 7A depicts an example diagram of a user interface for viewing a virtual representation of an EGM in a physical environment. The various components depicted in the example diagram are presented merely for explanatory purposes and may be modified or arranged differently than described. As shown, a view of the physical environment 700 is presented on a display of a mobile device 705A, as a view 710 of the physical environment 700. In some embodiments, the mobile device 705A may include a camera facing the environment capturing image data of the environment which is then presented on the display. In some embodiments, the display of mobile device 705 may be a pass-through display, or may be a transparent or see-through display. Initially, a graphical prompt 712 is presented. The prompt 712 may be movable by the user along the surface, and may indicate a location at which the virtual representation of the EGM should be placed.

Upon confirmation of a selected location, the mobile device 705B presents an updated view 720 of the physical environment 705B having the virtual representation of the EGMs 714 blended into the physical environment 700. In some embodiments, the view 720 may be a composited image having image data of the physical environment 700 and the image data for the virtual representation of the EGM 714. In some embodiments, the virtual representation is placed in accordance with the selected location such that the dimensions of the virtual EGM are consistent with the presentation of the physical environment. In some embodiments, the mobile device 705B presents a user selectable component for capturing an image of the view 720.

Figure 7B:
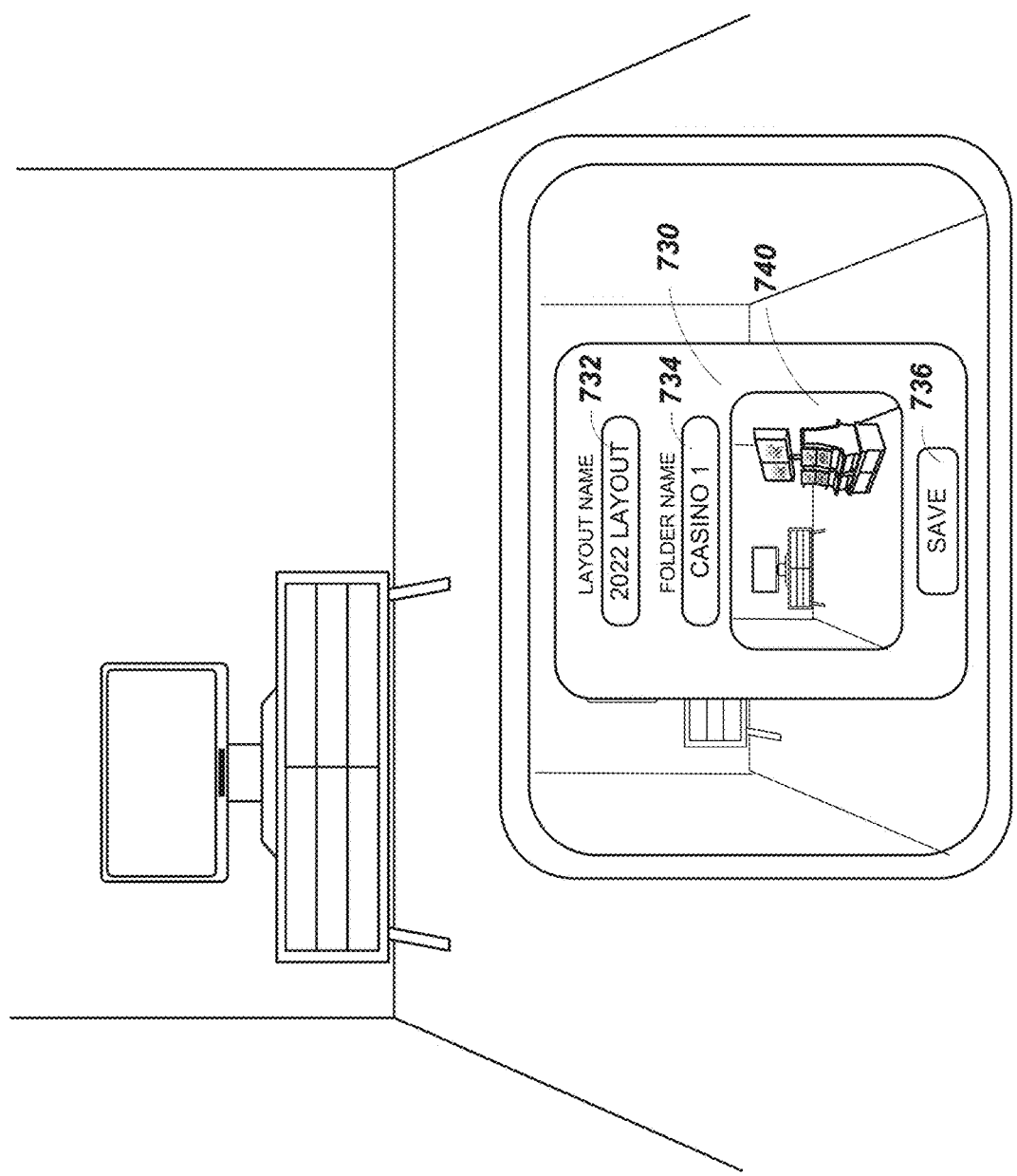

Turning to FIG. 7B, an example diagram is presented in which the view 720 of FIG. 7A is saved in response to a selection of the user-selectable component 716. In particular, FIG. 7B shows an interface panel 730 on which user input can be received in order to save the view 720 as an image. In some embodiments, a layout input component 732 is provided in which a user may enter a layout name. A folder input component 734 may also be provided, in which a user can provide a group of data to which the image should be like, such as a particular property, portfolio, favorited layouts, or the like. The interface panel 730 may also include a user-selectable input component 736 to save the layout accordingly. In some embodiments, the interface panel 730 also includes an image preview 740 of the view 720 as it will be saved.

Figure 8:
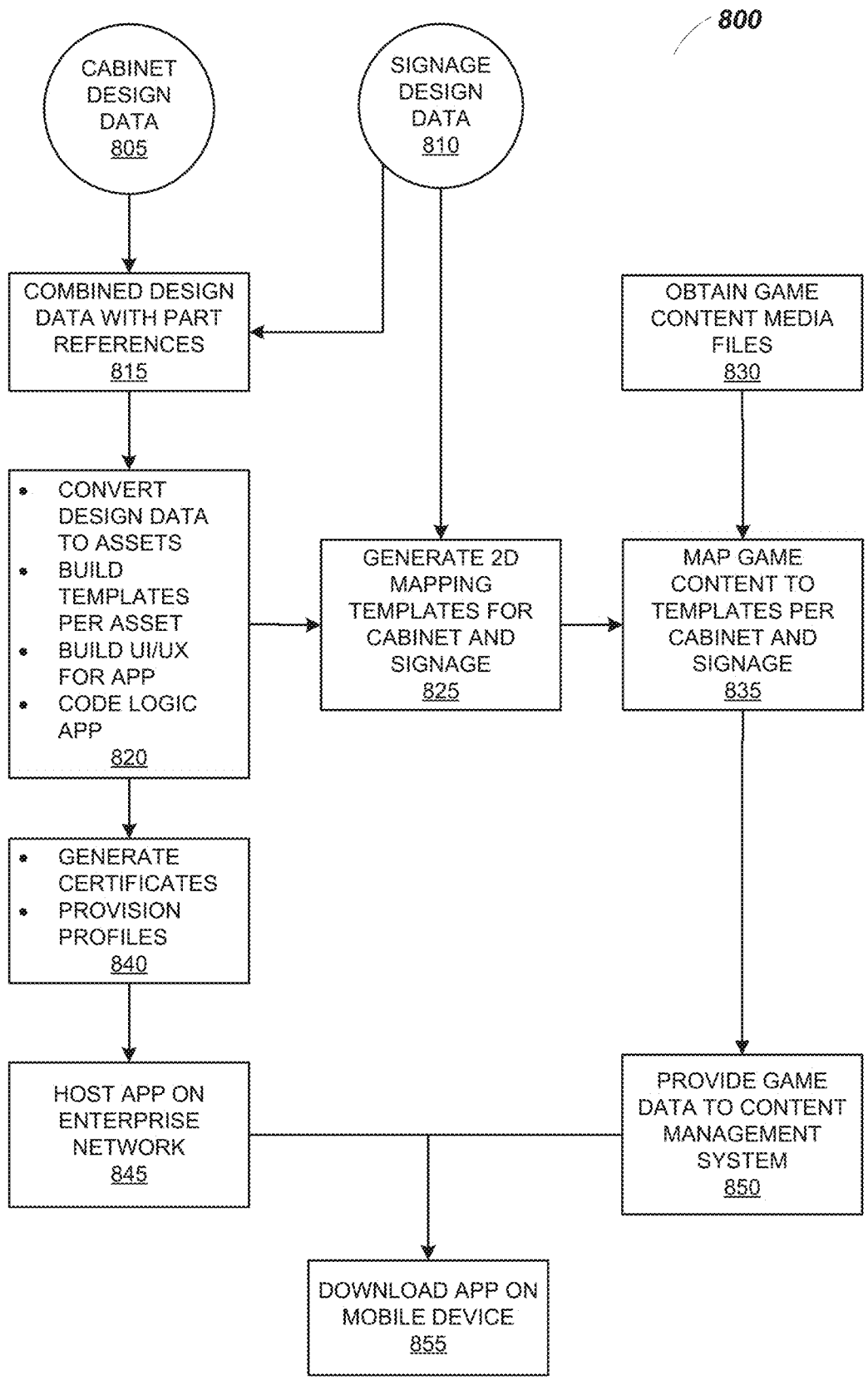
FIG. 8 depicts an example flowchart of a technique for providing real-world characteristics for virtual representations of EGMs, in accordance with one or more embodiments.

FIG. 8 depicts an example flowchart 800 of a technique for providing real-world characteristics for virtual representations of EGMs. The flowchart includes receiving, from Aristocrat Engineering, CAD data per cabinet (805). In addition, CAD data for signage is obtained (810). In some embodiments, the signage design data may be provided by a separate source than the cabinet design data. From the combined CAD data (815), an assembly file may be generated, for example by Solidworks. Then, the CAD files may be converted to real time assets (820). Templates may be built per asset (825), along with app logic and build UI/UX for the app, to obtain an Xcode project (840), for example using the Unity gaming engine. The Xcode project may include generated certificates, provisioning profiles, and the use of an Apple Developer Account. The Xcode project may be hosted on an Enterprise distribution system (845), such as Aristocrat's company portal.

Returning to the Unity build (820), per cabinet signage may be generated (825), for example, based on 2D mapping templates for a real time engine. The signage may be based on the mapping templates as well as a mapping guide, which may be based on the CAD data per signage. The cabinet data and signage may be fed into the Adobe Suite, which may also receive source assets, such as game content (830) from Global studios and Radiate game captures. The source assets may include media files, such as audio, video, image files, and the like. The source assets may also be fed into the Adobe Suite, which provides digital content creation by mapping all the game content to the templates per cabinet and signage (835). The Adobe Suite can output based off templates per cabinets and signage, for example in the form of .png or .mp4 files. The output may be provided to a Content Management System (CMS) (850), such as CrownPeak, which can enter gameslick data, analytics data, class filtering logic, cabinet/game class logic, and can store game statistics and video. Data from the CMS can be pushed via the internet to an app on a tablet or other mobile device, such as an iPad Pro (855). The app on the mobile device may also use the build from the company portal.

Figure 9:
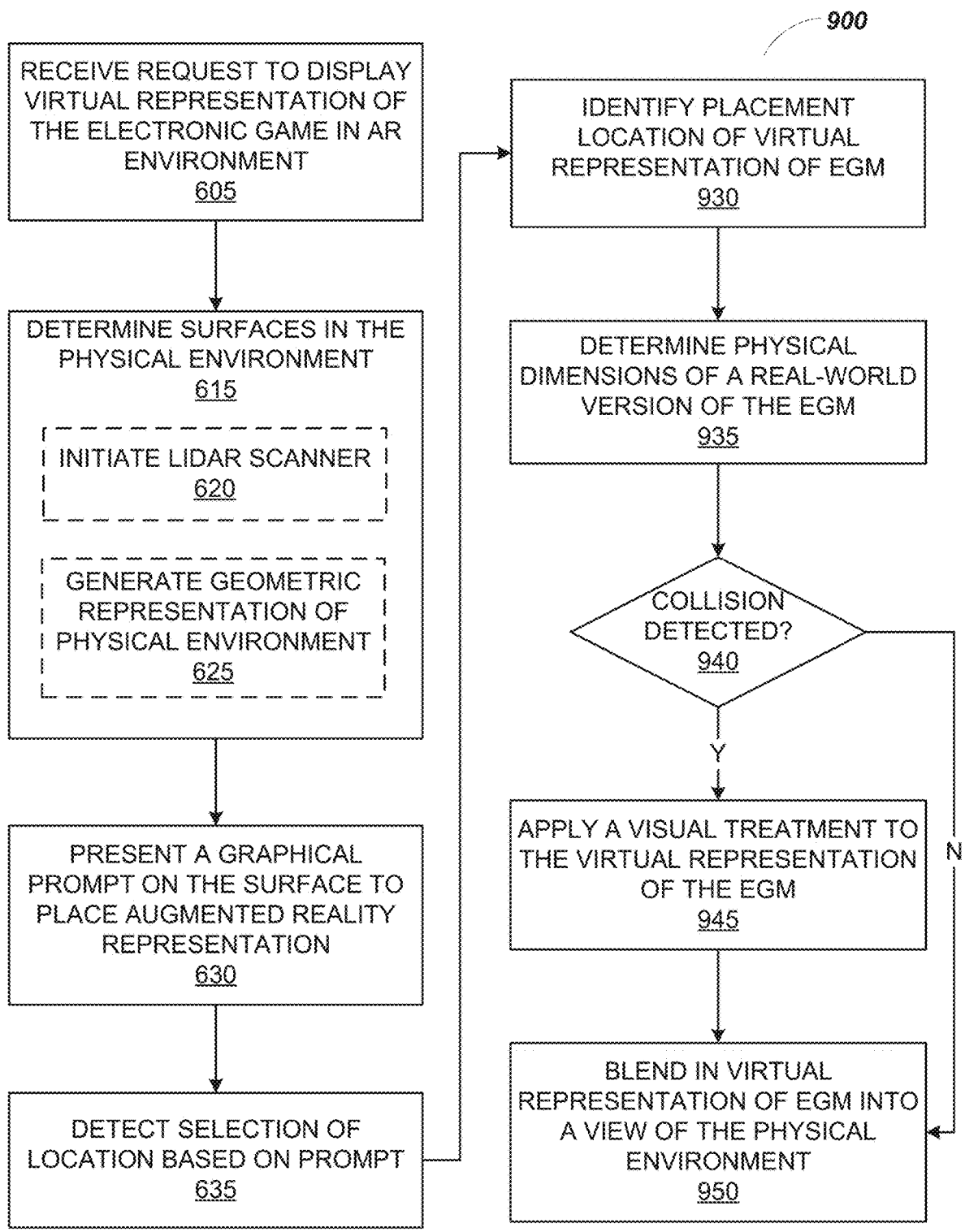
FIG. 9 depicts a flowchart of a technique for providing a visual indication of whether an EGM fits in a physical environment, in accordance with one or more embodiments.

FIG. 9 depicts a flowchart of a technique for providing a visual indication of whether an EGM fits in a physical environment, in accordance with one or more embodiments. The flowchart is depicted with a set of processes performed in a particular order. However, it should be understood that in certain embodiments, the various processes may be performed in a different order. Further, some processes presented in FIG. 9 may be omitted. The processes are described as being performed by particular components. However, in certain embodiments, the processes may be performed by alternative components.

The flowchart includes steps 605, 615, 620, 625, 630, and 635 from FIG. 6. As described above, this portion of FIG. 6 is directed to receiving a request to display a virtual representation of the electronic game in an augmented reality (AR) environment (605). At block 615, surfaces are determined in the physical environment. Optionally, at block 620, a scan of the environment is initiated. At 625, a geometric representation of the physical environment is generated. The flowchart 900 continues at block 630 where a graphical prompt is presented on the surface to place the AR representation of the electronic gaming machine. At bock 635, a selection of location is detected based on the prompt. The device may be configured to receive user input indicating a requested placement of virtual information, such as through detection of a touch on a region on the display that corresponds to a particular location on a surface in the view of the real-world environment, or another input action configured to trigger placement of the virtual representation of the electronic gaming device.

The flowchart 900 continues at block 930, where a placement location of the virtual representation of the EGM is identified. In some embodiments, a graphical prompt is presented on the surface to place the AR representation of the electronic gaming machine. The graphical prompt may be a movable preview of the virtual representation of the electronic gaming machine, or may be presented in the form of a box, a cursor, or other visual identifier, which may be moved around a view of the physical environment.

At block 935, physical dimensions of a real-world version of the EGM are determined. The physical dimensions may be prestored on the mobile device, and/or may be obtained from a content management server. The physical dimensions may be determined based on the combination of cabinet(s) and/or accessories from which the representation of the EGM was generated.

The flowchart 900 continues at block 940, where a determination is made regarding whether a collision is detected. The collision indicates that a real-world version of the EGM would fit in the physical environment at the location. This may be determined, for example, by determining whether the physical dimensions of the real-world version of the EGM fit in the physical environment at the physical location by analyzing the boundaries of the physical environment (i.e., surfaces, detected objects, and the like). Accordingly, whether a collision is detected is based on the placement of the virtual EMG, the dimensions of the real-world version of the EGM, and surfaces and/or other boundaries detected in the physical environment.

If at block 900 a determination is made that a collision occurs, then the flowchart 900 proceeds to block 945 and a visual treatment is applied to the virtual representation of the EGM. Then the flowchart concludes at block 950, where the virtual representation is blended into a view of the physical environment. Accordingly, the visual treatment is presented when a collision between the dimensions of the real-world EGM and the physical environment, whereas the flowchart concludes at block 950 and the virtual representation is blended into the environment without an additional visual treatment (i.e., the visual treatment indicating the collision) if no collision is detected.

Figure 10:
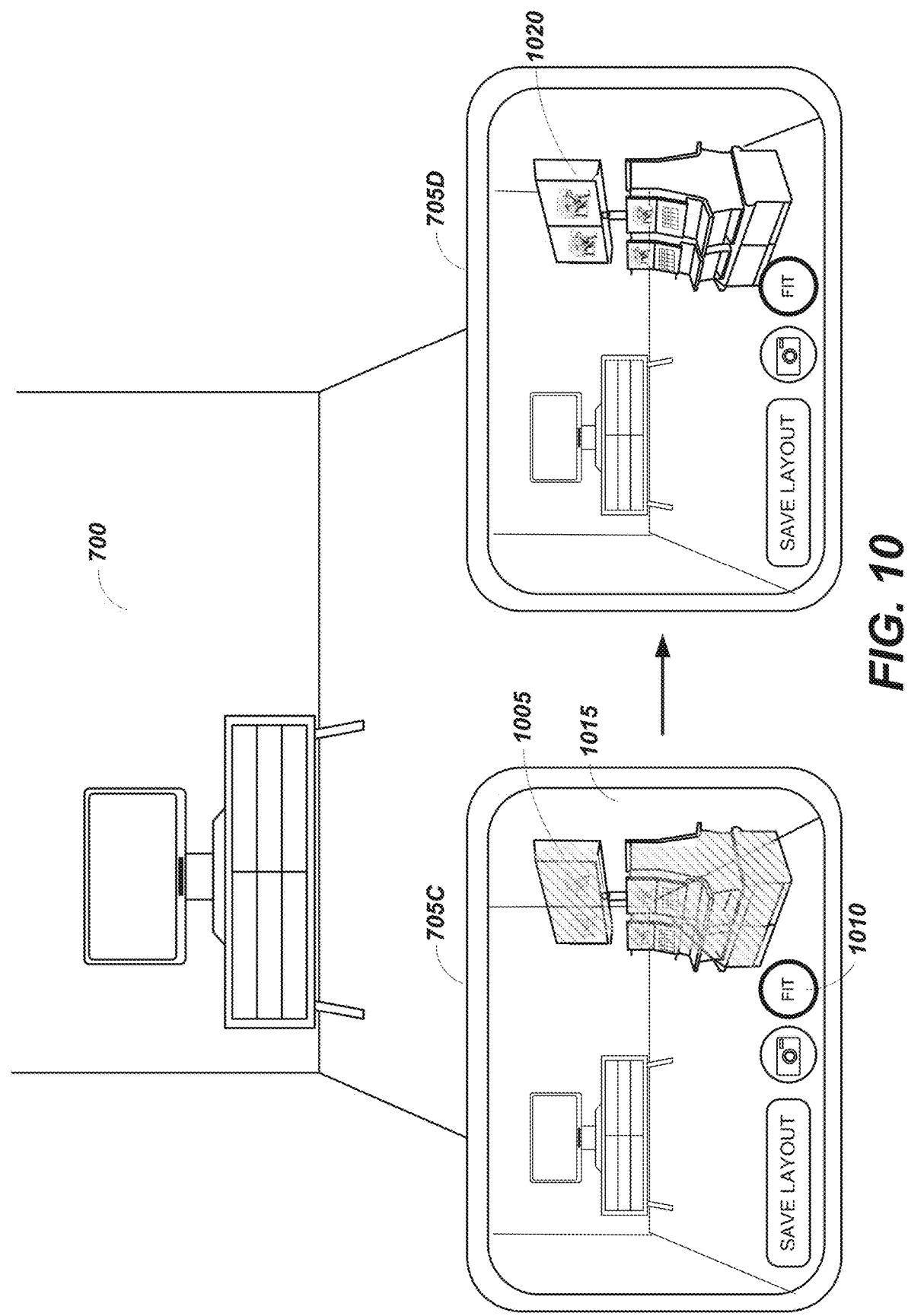
FIG. 10 depicts an example diagram is presented in which a representation of an EGM is presented to indicate whether a collision is detected, in accordance with one or more embodiments.

Turning to FIG. 10, an example diagram is presented in which a representation of an EGM is presented to indicate whether a collision is detected. In particular, FIG. 10 shows an interface on a mobile device 706C on which a representation of an EGM 1005 has been placed. As depicted, the interface includes a user-selectable component 1010 is activated or otherwise selected, which causes a rendering treatment to be applied to the representation of the EGM prior to presentation on the display.

As described above, the device 705 may scan the environment and generate a representation of the physical environment, such as one or more planes, a point cloud, mesh data, or the like. In some embodiments, the electronic device includes computer readable code to determine, for example based on the placement and/or geometric characteristics of the virtual representation of the EGM, and one or more planes and/or boundaries in the physical environment, whether a potential collision would occur if a real-world version of the virtual EGM were placed in the real-world environment. In some embodiments, if a determination is made that a potential collision would occur, then the virtual EGM may be rendered in such a manner as to provide a visual indication of such a collision, as shown by the representation of the EGM 1005 depicted in a blurred manner when it intersects the wall plane 1015. For example, the virtual representation may be presented in a particular color or pattern, such as presenting the cabinet in red.

By contrast, if a user moves the representation of the EGM to a location such that no collision is detected, the representation of the EGM is presented without a visual treatment. This is depicted by device 705D, where a user has moved the representation of the EGM away from the wall 1015 such that the collision is no longer detected. If no potential collision is detected, then the virtual EGM is presented as it would appear if placed in the physical environment accordingly.

Figure 11:
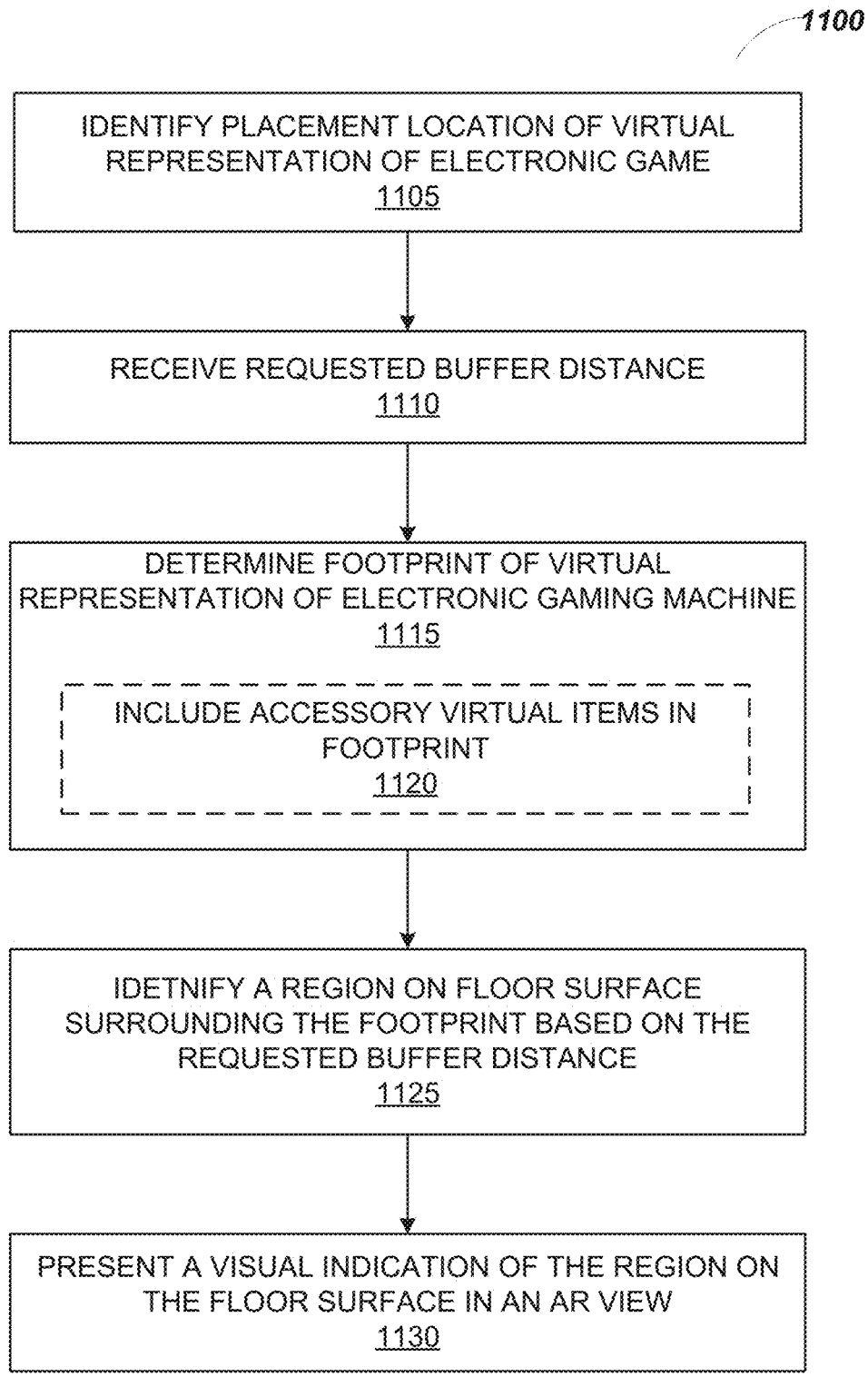
FIG. 11 depicts a flowchart of a technique for presenting a representation of a buffer distance around an EGM in an AR environment, in accordance with one or more embodiments.

FIG. 11 depicts a flowchart of a technique for presenting a representation of a buffer distance around an EGM in an AR environment, in accordance with one or more embodiments. In some embodiments, when a user is selecting a layout of one or more machines or banks of machines, it may be preferable to determine how much space is available around the machine, for example for foot traffic purposes, ADA compliance, and the like. The flowchart is depicted with a set of processes performed in a particular order. However, it should be understood that in certain embodiments, the various processes may be performed in a different order. Further, some processes presented in FIG. 11 may be omitted. The processes are described as being performed by particular components. However, in certain embodiments, the processes may be performed by alternative components.

The flowchart 1100 begins at block 1105, where a placement location is identified for the virtual representation of the EGM. In some embodiments, a graphical prompt is presented on the surface to place the AR representation of the electronic gaming machine. The graphical prompt may be a movable preview of the virtual representation of the electronic gaming machine, or may be presented in the form of a box, a cursor, or other visual identifier, which may be moved around a view of the physical environment.

At block 1110, a request is received for a buffer distance. In some embodiments, the request may be received via a user interface component by which a user can select a preferred buffer distance. The flowchart 1100 continues to block 1115, where a footprint of the representation of the EGM is determined. The footprint may be determined based on a region of the representation of the EGM which appears to make contact with the surface (i.e., the bottom surface of the EGM). Alternatively, the footprint may be based on the furthest protruding point on each side of the EGM. Optionally, at block 1120, the footprint is determined based on additional accessory virtual items. This may include, for example, accessory panels, seating, and the like. In some embodiments, the interface may allow a user to select an accessory item for presentation and/or determination of the EGM footprint even if the item is not part of the EGM, such as a chair or the like.

The flowchart 1100 continues at block 1125, where a region on the floor surface is identified surrounding the footprint based on the requested buffer distance. In some embodiments, this region surrounds the footprint and extends from the footprint in each direction along the floor surface for the selected buffer distance. The flowchart 1100 concludes at block 1130 where the visual indication is presented of the region on the floor surface in an AR view. For example, the region may be presented as a shaded area, and may be presented in a particular pattern and/or color, or the like.

Figure 12:
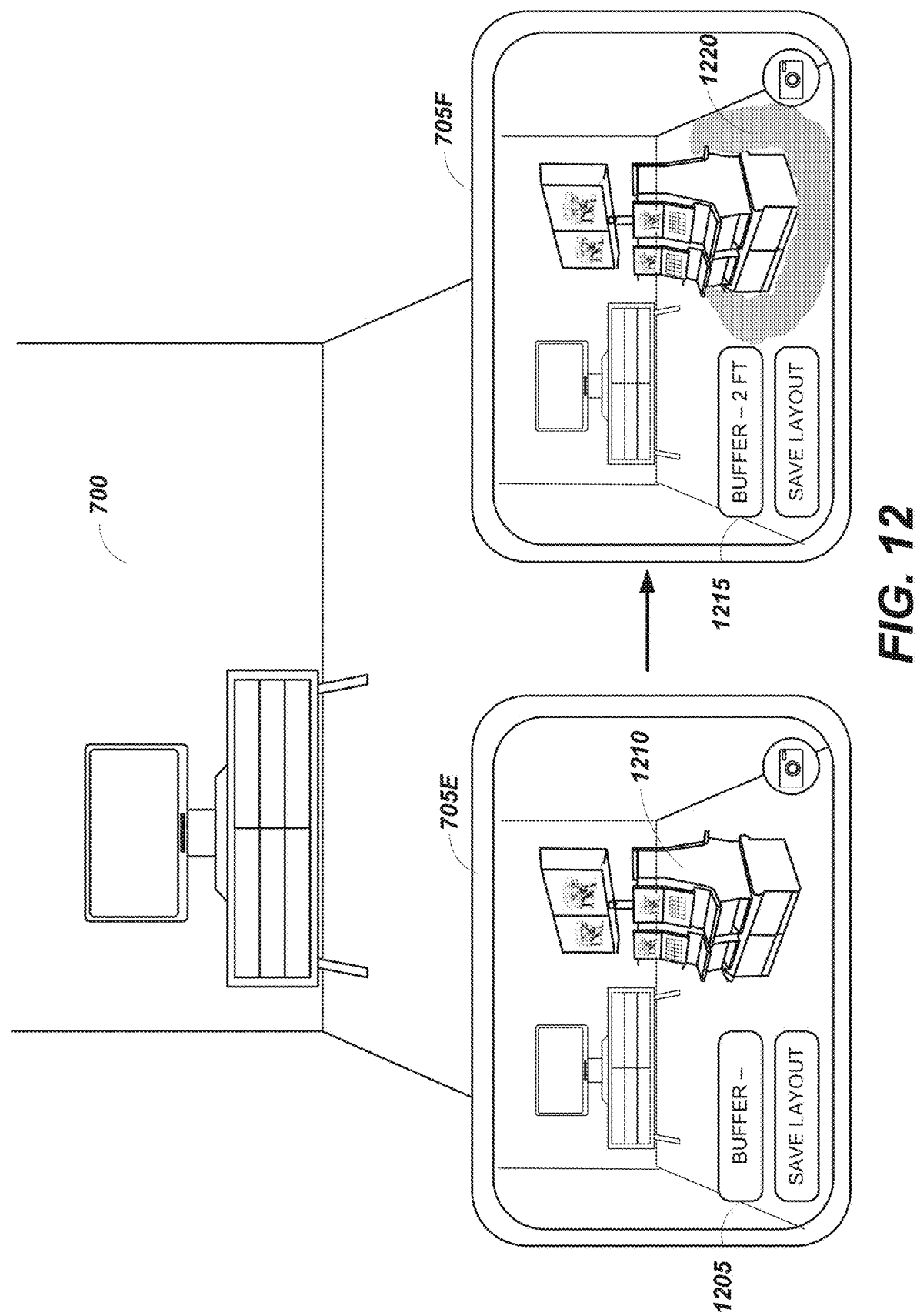
FIG. 12 depicts an example diagram is presented in which a representation of an EGM is presented with a representation of a buffer region around the EGM.

Turning to FIG. 12, an example diagram is presented in which a representation of an EGM is presented with a representation of a buffer region around the EGM. In particular, FIG. 12 shows an interface on a mobile device 706E on which a representation of an EGM 1210 has been placed. As depicted, the interface includes a user-selectable component 1205 is activated or otherwise selected, which allows a user to select a requested buffer distance for representation in the AR view.

As described above, the device 705 may scan the environment and generate a representation of the physical environment, such as one or more planes, a point cloud, mesh data, or the like. In some embodiments, the electronic device includes computer readable code to determine, for example based on the placement and/or geometric characteristics of the virtual representation of the EGM, and one or more planes and/or boundaries in the physical environment, including a floor surface.

In response to the user requesting a buffer distance around the representation of the EGM, then a visual representation is presented on the floor surface to represent the buffer region. As shown on mobile device 705F, a buffer distance of 2 feet is selected at 1215. As such, the region 1220 is presented on the floor surface surrounding the representation of the EGM at a distance of 2 feet. Accordingly, a user may use the buffer distance to place additional cabinets in the environment, or to plan for a layout that allows foot traffic around preexisting objects in the physical environment.

Figure 13:
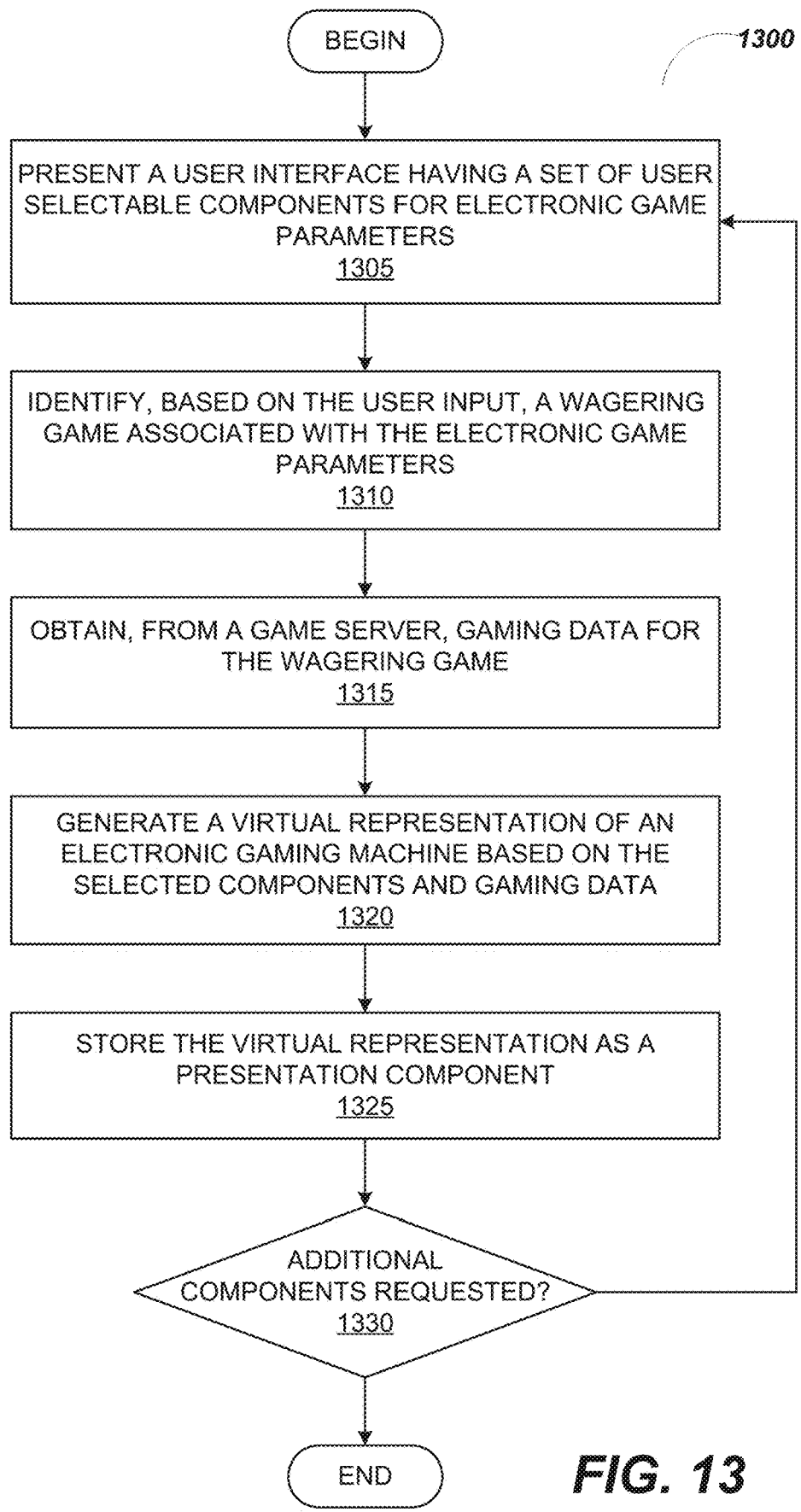
FIG. 13 depicts a flowchart of a technique for generating a presentation is presented, in accordance with one or more embodiments.

Turning to FIG. 13, a flowchart of a technique for generating a presentation is presented. The flowchart is depicted with a set of processes performed in a particular order. However, it should be understood that in certain embodiments, the various processes may be performed in a different order. Further, some processes presented in FIG. 13 may be omitted. The processes are described as being performed by particular components. However, in certain embodiments, the processes may be performed by alternative components.

The flowchart 1300 begins at block 1305, where a user interface is presented having a set of user selectable components for electronic game parameters. The user interface may be a pitch creation interface. In some embodiments, the pitch creation interface may include modules to generate a pitch presentation. The pitch interface may include options to work on an existing pitch, or begin a new pitch. The pitch creation interface can also include predefined pitches, predefined pitch components, or the like. In addition, the pitch creation interface may include a cabinet creation interface to generate a new representation of an EGM to add to a pitch. These selectable components may be presented in one or more interface panels. In some embodiments, the options provided in the interface panels will dynamically change based on user input, as described in greater detail above with respect to FIG. 5B. In some embodiments, additional parameters may be provided for selection, such as toppers, seating, and other accessory items to the cabinet and/or bank of cabinets.

At block 1310, the wagering game is identified based on user input, which is associated with the electronic game parameters. In one or more embodiments, the wagering game may include the specific game selected for a cabinet or bank of cabinets. In some embodiments, the user interface also includes functionality to modify a cabinet and/or other hardware for the virtual representation of the EGM. The user interface may allow a user to select from various cabinets and banking systems, thereby providing the user with configuration options.

The flowchart 1300 continues at block 1315, where gaming data is obtained from a game server for the wagering game. The gaming data may include, for example, media to be presented on the representation of the electronic gaming device based on the wagering game, topper media, seating media, and other accessory media for presentation on accessory devices. In addition, other data regarding the wagering game may be obtained, such as a game family top which the game belongs, description information, statistics, and the like. In some embodiments, the gaming data may be obtained from a content management server and stored on the device, or maybe obtained locally, having been pre-fetched from a content management server.

The flowchart 1300 continues at block 1320, where a virtual representation of an electronic gaming machine is generated based on the selected components and gaming data. In some embodiments, the virtual representation may include a graphical representation of the electronic gaming device that is comprised of the selected configuration. As such, the proportions of the graphical representation of the electronic gaming device may correspond to a real-world electronic gaming device.

The flowchart 1300 proceeds to block 1325, where the user interface provides an interface for saving the virtual representation of the EGM (or bank of EGMs) as a presentation component. In some embodiments, the presentation component may be presented as a module in a presentation interface, and may be modified within the presentation interface to change an order, or the like. A determination is made at block 1330 whether additional components are requested for the presentation, if so, the flowchart 1300 returns to presenting the presentation interface and continues until no additional components are requested.

Figure 14:
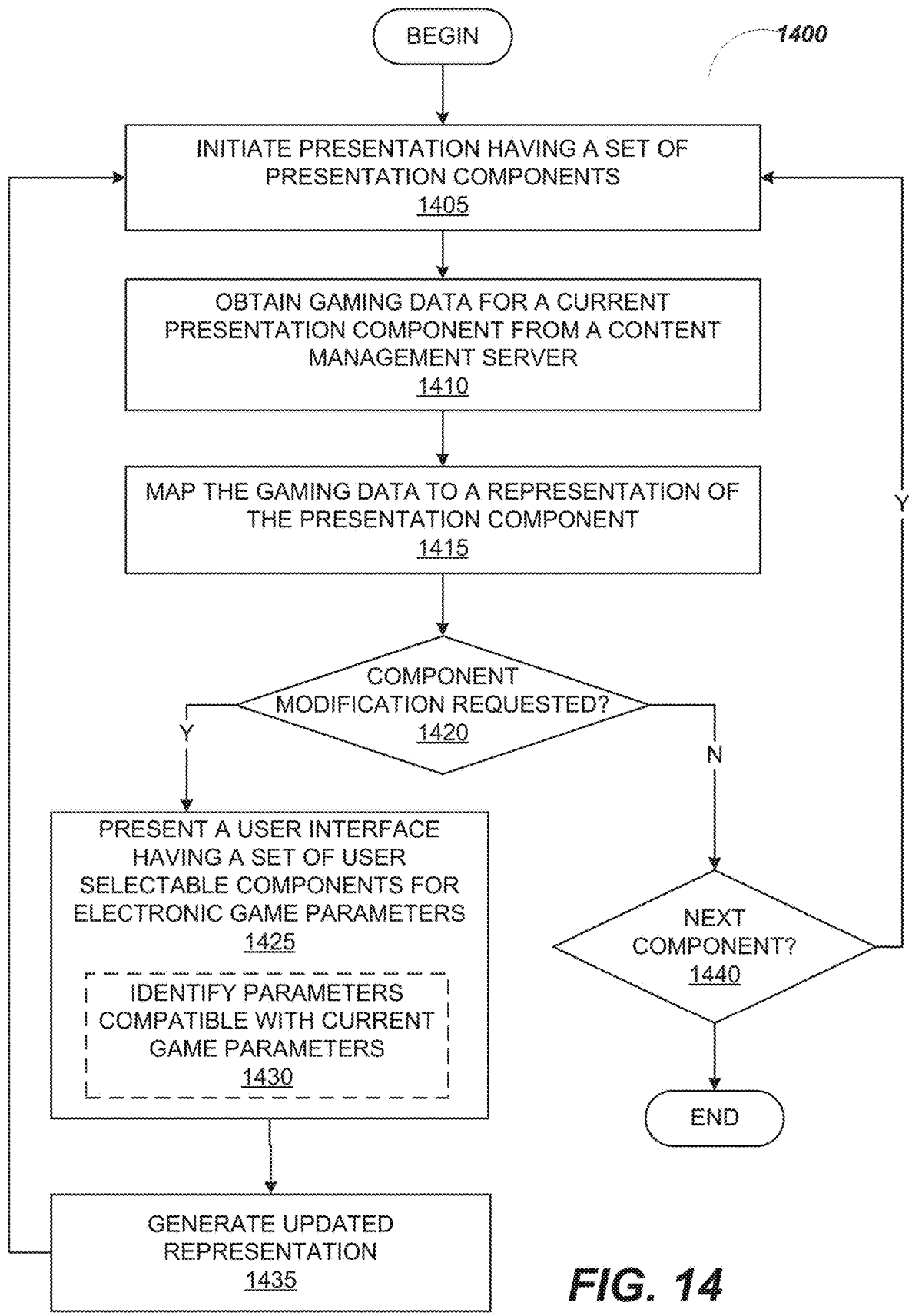
FIG. 14, a flowchart of a technique for presenting a pitch is presented, in accordance with one or more embodiments.

Turning to FIG. 14, a flowchart of a technique for presenting a pitch is presented. The flowchart is depicted with a set of processes performed in a particular order. However, it should be understood that in certain embodiments, the various processes may be performed in a different order. Further, some processes presented in FIG. 14 may be omitted. The processes are described as being performed by particular components. However, in certain embodiments, the processes may be performed by alternative components.

The flowchart 1400 begins at block 1405, where a presentation is initiated having a set of presentation components. Each presentation component may include one or more representation of EGMs, banks of EGMs, informational pages, and the like. The components can be presented in a landing page in which the components are selectable to go directly to the component. Alternatively, a presentation mode can be initiated such that the mobile device navigates through the presentation components.

The flowchart 1400 continues at block 1410, where gaming data is obtained for a current presentation component from a content management server. The presentation data for the component may include a representation of the associated EGM, and/or additional information about the wagering game and/or EGM. In some embodiments, the gaming data may be pre-stored on the local device from the content management server. Alternatively, the gaming data may be obtained from the content management server in real time during the presentation mode. In some embodiments, certain gaming data may be pre-stored while some data may be obtained during the presentation mode.

The flowchart 1400 continues at block 1415, where the gaming data is mapped to a representation of the presentation component. In some embodiments, the gaming data is matched to geometric representation of the electronic gaming machine. In some embodiments, the EGM(s) may be associated with 2D or 3D data corresponding to the shape of the device. In some embodiments, the gaming data may include visual media, such as images or video, which are projected onto the geometric shape of the cabinet (or cabinets of a bank) to cause the virtual representation to appear as an operating electronic gaming machine configured for the selected wagering game. The media may include pre-recorded gameplay such that the virtual representation appears to be an operating version of the wagering game on the cabinet(s). The media may thus be projected onto the geometric shape of the EMG(s) such that the representation of the EGM(s) is presented with the media.

At block 1420, a determination is made regarding whether any component modification is requested. For example, during a presentation mode, a user may use the presentation interface to modify the particular configuration of the EGM(s). If no component modification is requested, then the flowchart continues to block 1440, and a determination is made regarding whether the presentation is navigated to the next component. In some embodiments, the presentation mode may navigate to the next presentation component in response to user input. The flowchart 1400 returns to block 1405 and the presentation mode continues. Once a determination is made a block 1440 that no additional presentation components remain (i.e., when the presentation mode has navigated through the final presentation component), then the flowchart 1400 concludes.

If a determination is made at block 1420 that a component modification is requested, then the flowchart continues at block 1425, a user interface is presented having a set of user selectable components for electronic game parameters. In some embodiments, this may be based on a cabinet generation interface. Thus, the interface may provide selectable components to modify EGM parameters, such as the cabinet type, banking, wagering game, and the like. In addition, accessory devices (such as seating, signage, and the like) may be added or removed. Optionally, as shown at block 1430, the user interface may present components which are compatible with current game parameters. For example, the set of wagering games presented for selection may be based on wagering games selected on a current cabinet type.

The flowchart 1400 continues at block 1435, where an updated representation of the EGM(s) is generated. This may include, for example, remapping the gaming data to the representation of the EGM(s), obtaining updating gaming data, and the like. The flowchart then returns to block 1405, and the presentation mode include navigating through additional presentation components of the presentation.

Figure 15A:
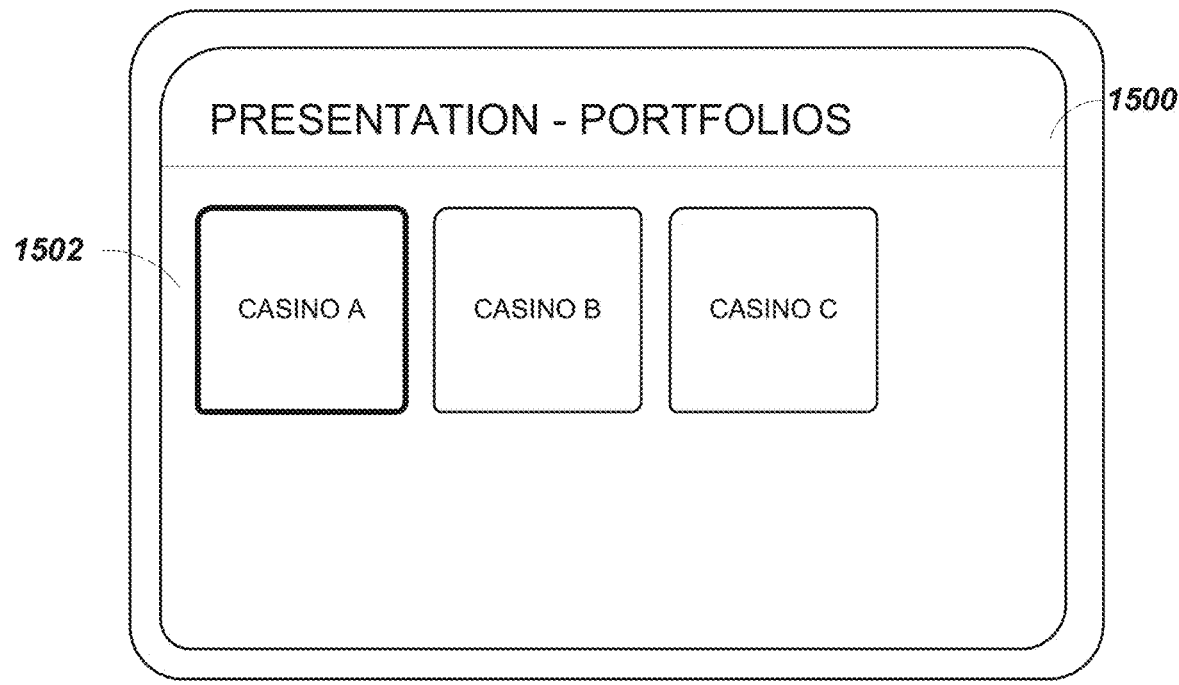
FIGS. 15A-15D depict example user interfaces for generating a presentation of one or more saved layouts of EGMs, according to some embodiments.

FIGS. 15A-15D depict example user interfaces for generating a presentation of one or more saved layouts of EGMs, according to some embodiments. FIG. 15A begins at landing page 1500. A landing page is provided having various user input components, including a set of workspaces corresponding to different folders, or portfolios. For purposes of the example, the portfolios are associated with different casino names 1502, which may be the subject of the various presentations.

Figure 15B:
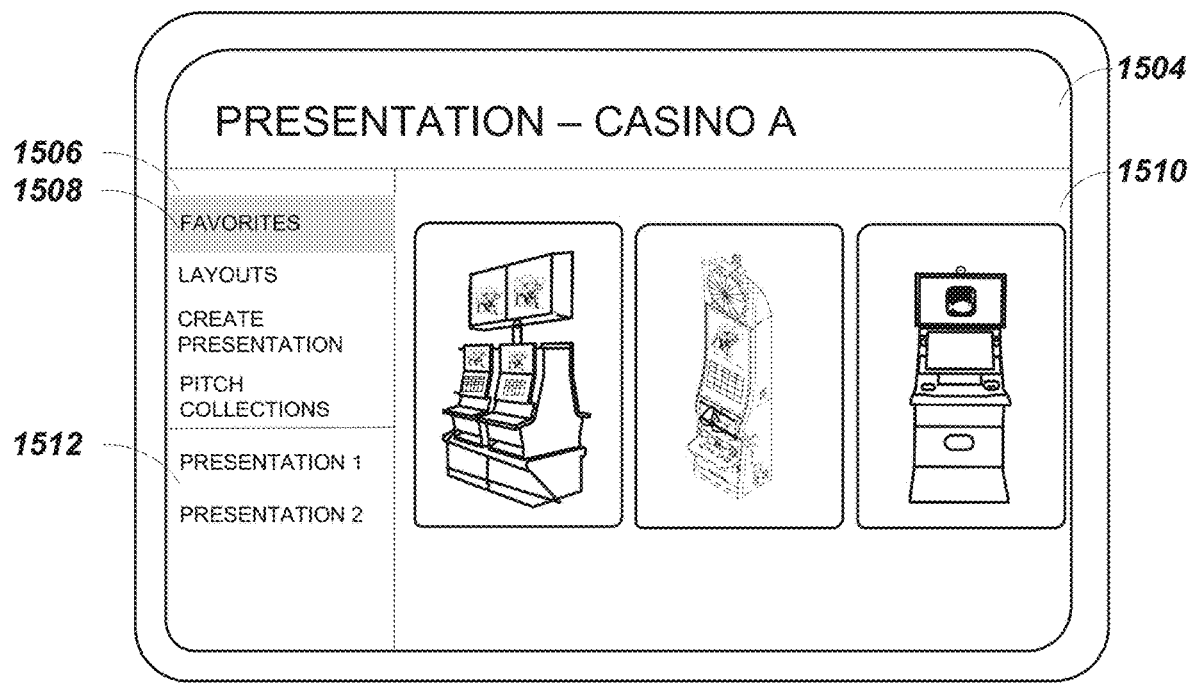

If a workspace option is selected (i.e., the Casino A option in FIG. 15A), then a workspace menu is presented, as shown in FIG. 15B, which includes a presentation interface 1504. The presentation interface includes a menu 1506 of interfaces available to assist in generating a presentation. These include favorites, which may relate to predefined components generated by a user and available across multiple portfolios and presentations. The menu 1506 also includes layouts, which may feature predefined layouts including or excluding the favorites items. The menu also includes a create presentation option. This option, when selected, will generate a new presentation for the current portfolio (here, Casino A). Finally, a pitch collections option is presented. This may be a selection of predefined layouts or other presentation components which may be reviewed and/or added to other presentations. In some embodiments, the components within the pitch collections may be organizational and available to multiple users, whereas the layouts or favorites may be user specific.

Figure 15C:
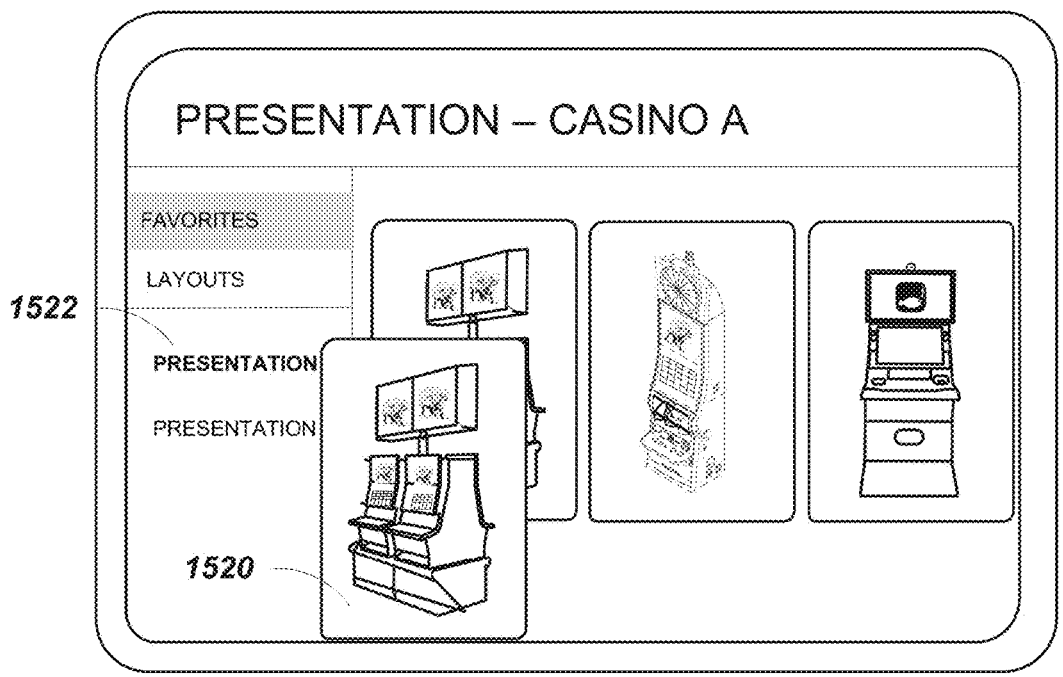

The presentations associated with the Casino A workspace are presented in a presentation list 1512. In the example shown in FIG. 15B, the Favorites 1508 option is selected from the menu 1506. Accordingly, the Favorites interface 1510 is presented. This favorites interface 1510 includes a set of cabinets and layouts which are predefined and available for adding to a presentation from the list of presentations 1512. As shown in FIG. 15C, in some embodiments, the various presentation components can be added to a presentation by dragging the component to a particular presentation for the Casino A workspace. Each presentation component can represent a particular EGM or set of EGMs, layout, or the like. The presentation component is associated with presentation data for that component, including media, gaming data, statistical information, and the like. In this example, the presentation component 1520 is dragged over to the presentation list. In particular, the presentation component 1520 is dragged to the presentation 1 item. In response, a copy of the presentation component 1520 is added to presentation 1.

Figure 15D:
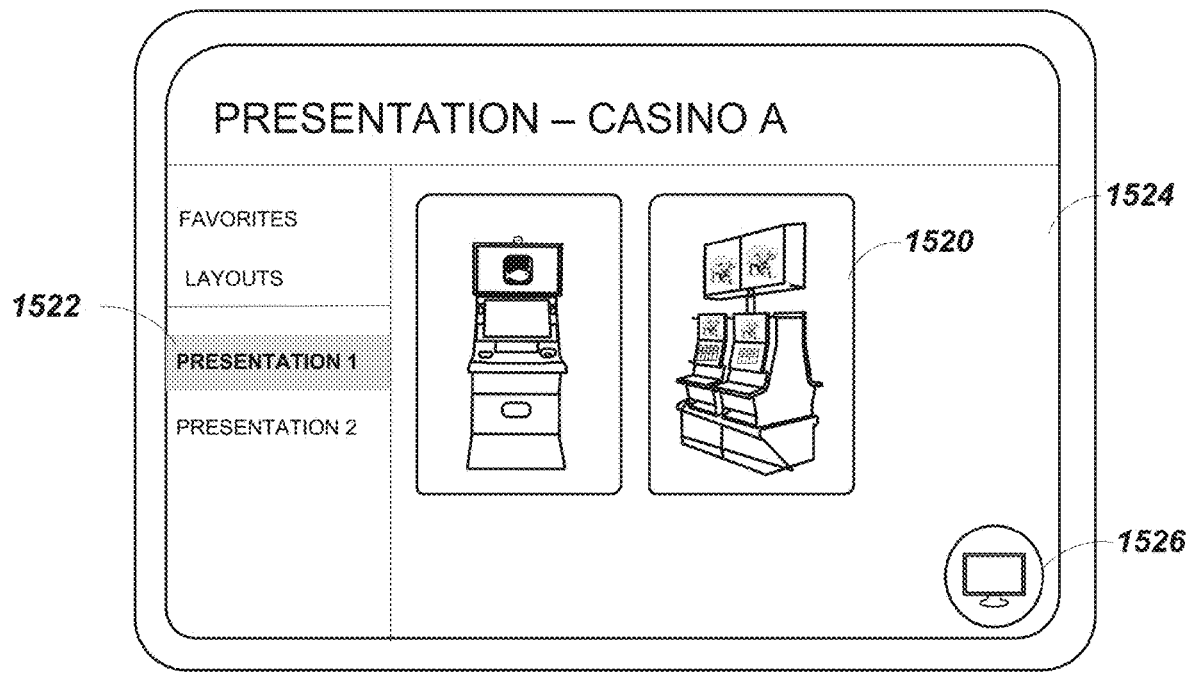

Proceeding to FIG. 15D, presentation 1 1522 is selected for the presentation list. Accordingly, a presentation interface 1524 associated with presentation 1 is presented. As shown, presentation component 1520 has been added to presentation 1. The presentation interface 1524 additionally includes a user input component 1526 to initiate a presentation mode, which will be described in greater detail below with respect to FIG. 16.

Figure 16A:
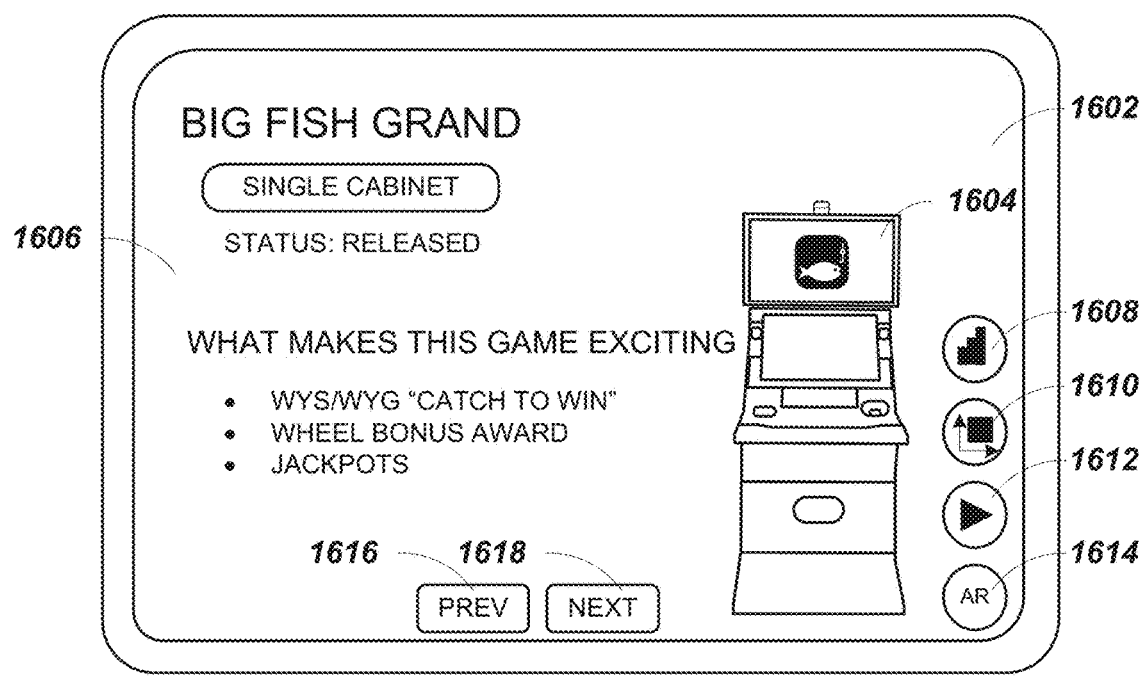
FIG. 16A-F depicts a set of example user interfaces is presented for a presentation mode, in accordance with one or more embodiments.

Turning to FIG. 16A-F, a set of example user interfaces is presented for a presentation mode. FIG. 16A shows a first interface for a presentation. For purposes of this example, the interface for a first presentation component 1602 is presented. In some embodiments, the interface for the first presentation component may be presented in response to a selection of user input component 1526 from FIG. 15D, causing the initiation of the presentation 1.

FIG. 16A depicts a landing page 1602 for a first presentation component. The landing page 1602 includes the representation of the EGM 1604 associated with the presentation component, as well as additional gaming data 1606 for the EGM 1604. In addition, the landing page includes navigable components 1616 and 1618, by which the presentation 1 can be navigated. Further, the landing page includes a set of selectable options to see additional presentation data for the presentation component. These include a statistics button 1608, a dimensions button 1610, a playback button 1612, and an augmented reality button 1614. Each of these components will be described in greater detail below.

Figure 16B:
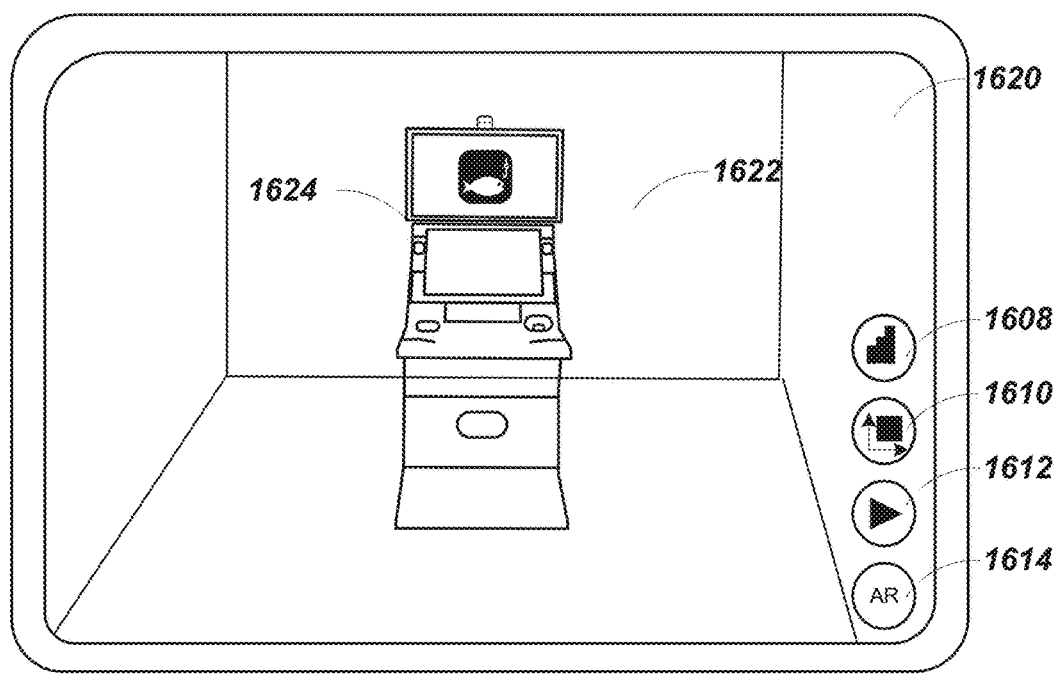

FIG. 16B depicts an augmented reality interface 1620. The augmented reality interface can be presented in response to receiving user input at the augmented reality button 1614, for example from FIG. 16A. This interface is provided by initiating an augmented reality mode, in which a virtual representation of the EGM 1624 is presented within a view of the real environment 1622. In some embodiments, the virtual representation may be provided using the various techniques described above with respect to FIGS. 6-12.

Figure 16C:
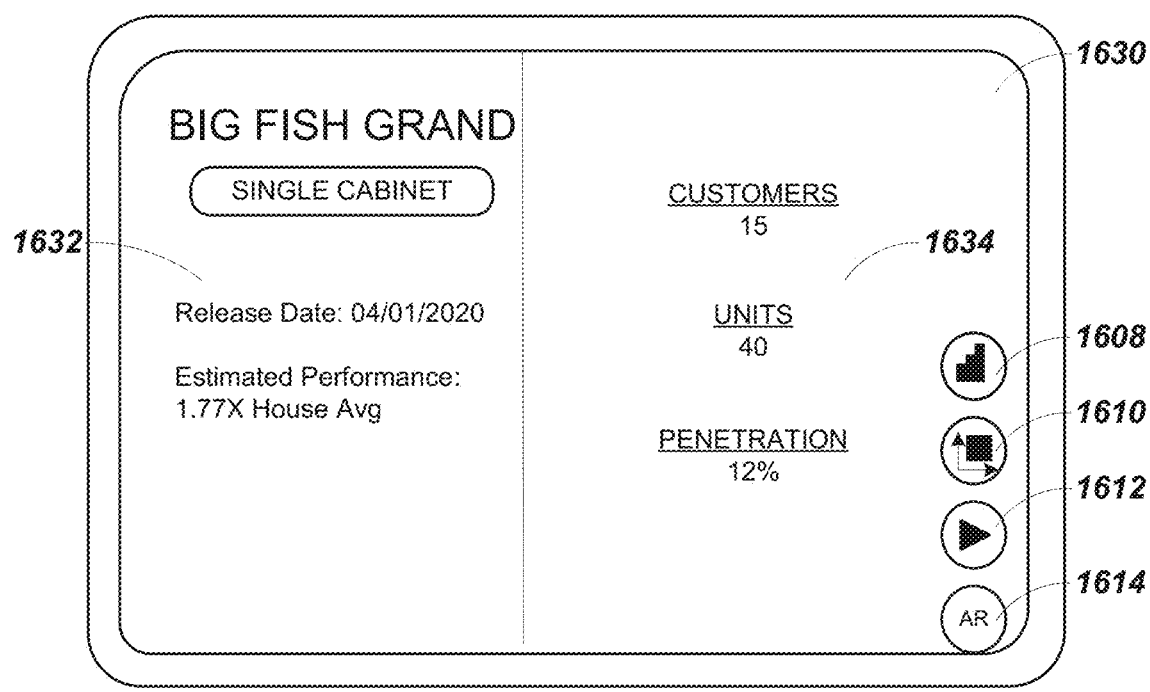

FIG. 16C depicts a statistics interface 1630. The statistics interface can be presented in response to receiving user input at the statistics button 1608, for example from FIG. 16A. This interface is provided by obtaining statistics for the particular wagering game for the EGM that is the subject of the presentation component. The statistics may be obtained from a content management server, and may be prefetched, or may be obtained in real time such that the statistical data is presented in the interface in real time or near real time. The statistics information may include such metrics as number of customers, units deployed, performance, penetration, and the like. In some embodiments, the statistics may include global statistics, regional statistics, site-based statistics, customer-based statistics, or some combination thereof.

Figure 16D:
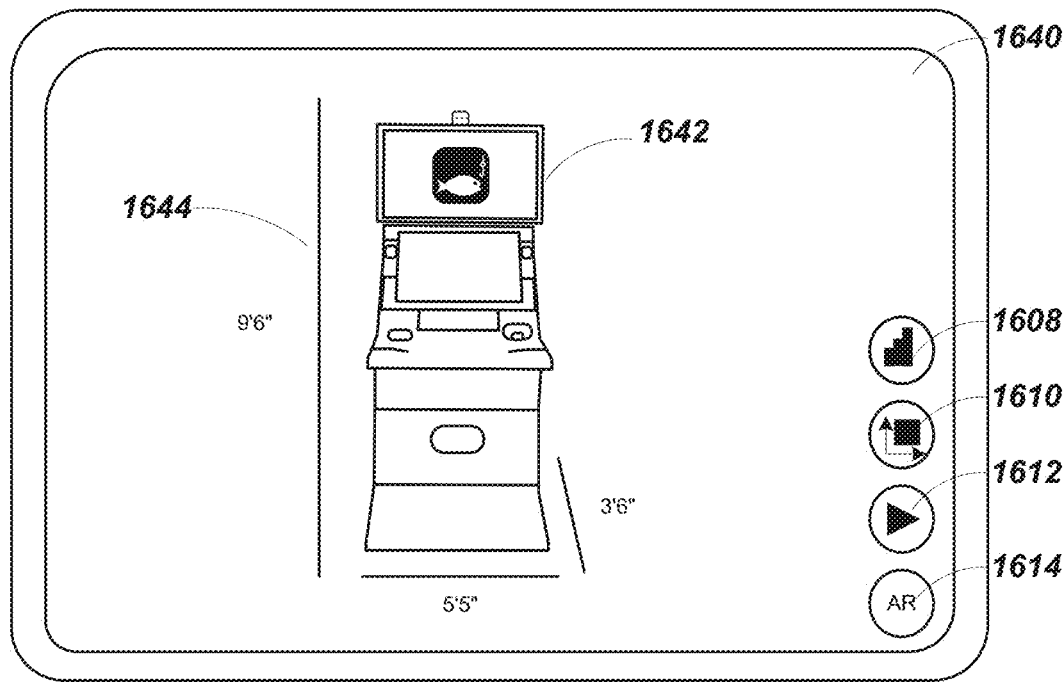

FIG. 16D depicts a dimensions interface 1640. The dimensions interface can be presented in response to receiving user input at the dimensions button 1610, for example from FIG. 16A. This interface is provided by retrieving dimensional information for the EGM from the gaming data received from the content management server. The dimensional information 1644 can be presented along with a representation of the associated EGM 1642.

Figure 16E:
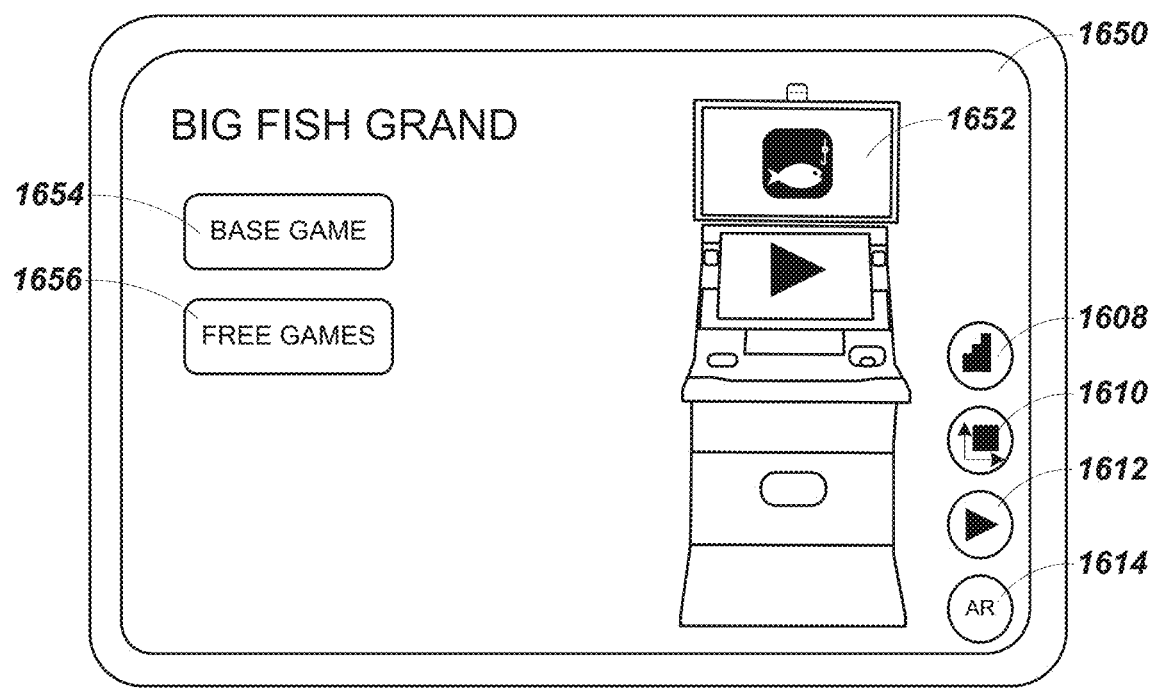

FIG. 16E depicts a playback interface 1650. The playback interface 1650 can be presented in response to receiving user input at the playback button 1612, for example from FIG. 16A. This interface includes selectable media options which may be presented on the representation of the EGM. For purposes of this example, the selectable media items include a base game 1654 and free games 1656. In some embodiments, the mobile device is configured to map media received from the content management system onto a geometry of the representation of the EGM. As such, the media presented on the representation 1652 is consistent with media presented on real-world playable gaming devices.

Figure 16F:
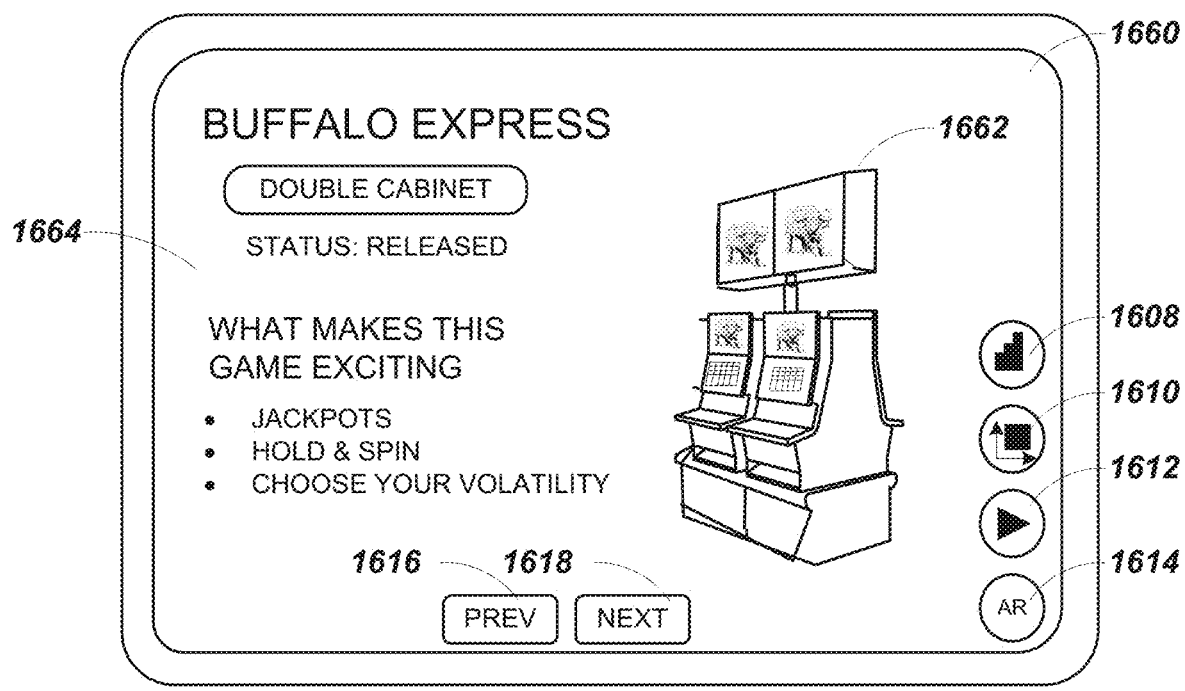

FIG. 16F depicts a landing page 1660 for a second presentation component. The second landing page 1660 can be presented in response to receiving user input at the navigation button 1618, for example from FIG. 16A. The landing page 1660 includes the representation of the EGM 1662 associated with the presentation component, as well as additional gaming data 1664 for the EGM 1662. In addition, the landing page includes navigable components 1616 and 1618, by which the presentation 1 can be navigated. Further, the landing page includes a set of selectable options to see additional presentation data for the presentation component. These include the statistics button 1608, a dimensions button 1610, a playback button 1612, and an augmented reality button 1614. Each of these components behave as described above, but, when selected from the landing page for the second presentation component 1660, provide a version of the various interfaces corresponding to the EGM 1662.

Figure 17:
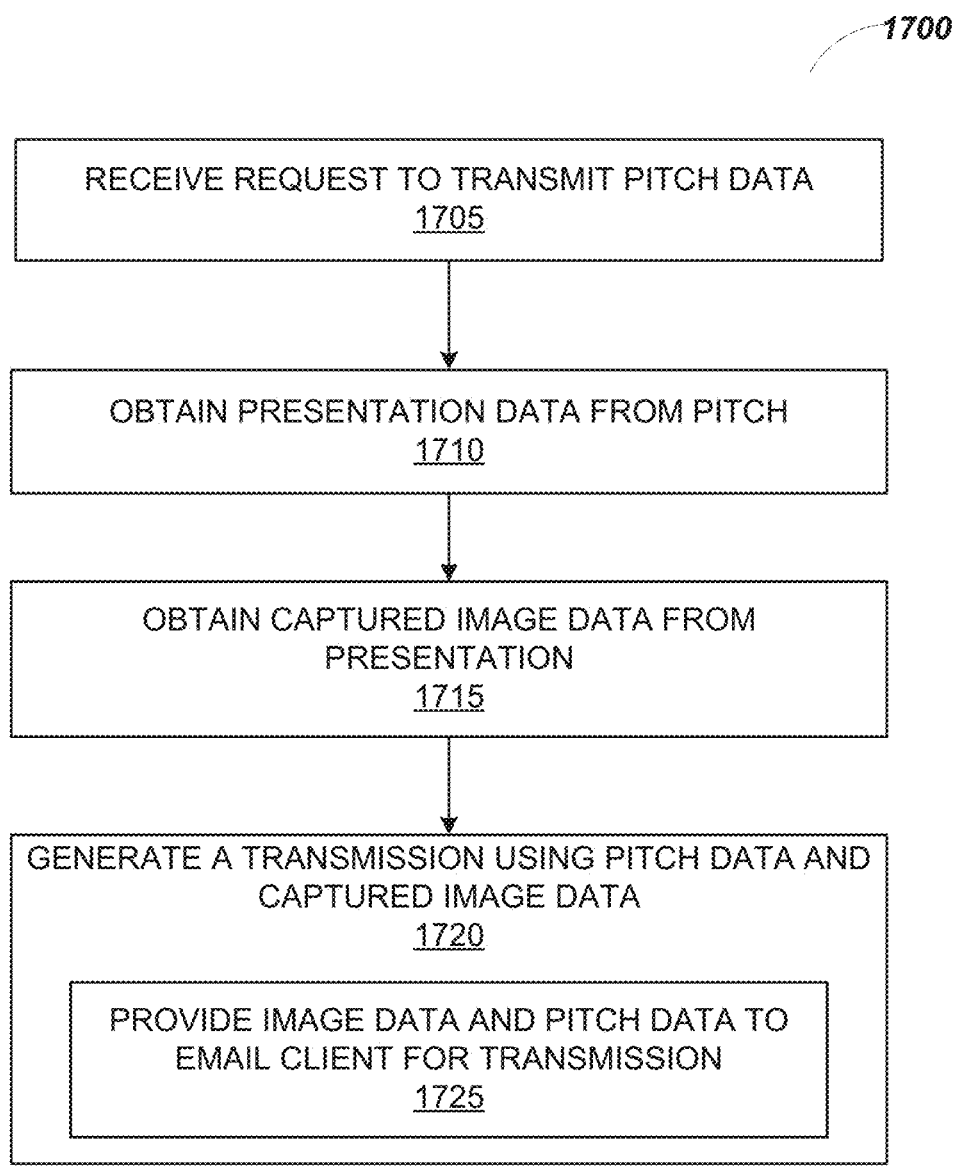
FIG. 17 depicts a flowchart of an example technique for generating a transmission based on the pitch data, in accordance with one or more embodiments.

In some embodiments, a presentation preview may include a user input component for generating a transmission based on the presentation. This may include generating an order, and/or generating a digital corresponding based on the configuration information from the presentation. FIG. 17 depicts a flowchart 1700 of an example technique for generating a transmission based on the pitch data. The flowchart is depicted with a set of processes performed in a particular order. However, it should be understood that in certain embodiments, the various processes may be performed in a different order. Further, some processes presented in FIG. 17 may be omitted. The processes are described as being performed by particular components. However, in certain embodiments, the processes may be performed by alternative components.

The flowchart begins at block 1700, where a request is received to transmit the pitch data. In some embodiments, a prompt may be presented, for example to generate an order or to transmit additional information via an electronic communication. At block 1710, presentation data is obtained from the pitch. In some embodiments, an interface may be presented to allow a user to select presentation components from within a presentation for which additional data is to be presented. The presentation data may include the gaming data and/or EGM parameters from the Further, at block 1715, additional image data for the presentation may be obtained. This may occur, for example, if a user has captured AR images of a representation of an EGM in a physical environment.

The flowchart 1700 concludes at block 1720, where a transmission is generated using the pitch data and captured image data. In some embodiments, the transmission includes an order. Generating the order may cause the cabinet configurations to be placed in an order form. The order form may then be transmitted to an order fulfillment receiving device for processing.

With respect to an electronic transmission, an email client may be triggered to transmit a PDF or other data structure having the gaming information from the EGM representations selected from the presentation. In some embodiments, as shown at 1725, the image data is also attached to the email for transmission by the email client. In some embodiments, this email may then be transmitted to a customer for later review.

Figure 18:
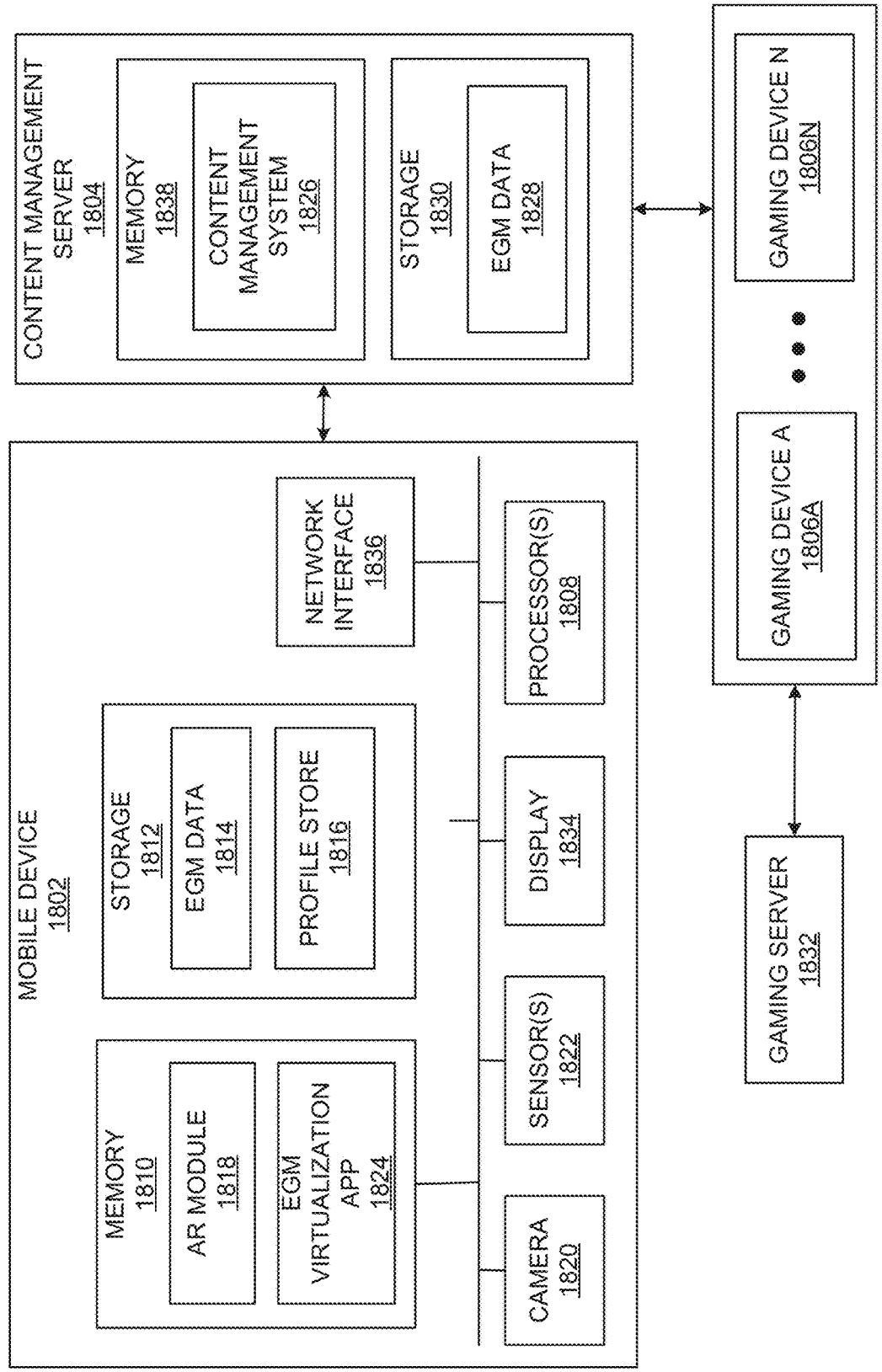
FIG. 18 depicts an example network diagram in which embodiments described herein may operate, in accordance with one or more embodiments.

FIG. 18 depicts an example network diagram 1800 in which embodiments described herein may operate. The network diagram includes a mobile device 1802, a content management server 1804, and a set of gaming devices, such as EGMs 1806A-1806N. The mobile device 1802 may be communicably connected to content management server 1804 via a network interface 1836.

The mobile device 1802 may be an electronic device, such as a tablet computer, wearable device, or the like, from which virtual representations of EGMs may be generated and presented. The mobile device includes one or more processors 1808 configured to implement computer code stored, for example, in the memory 1810. The processor(s) 1808 may include one or more processors, such as one or more central processing units, one or more graphical processing units, or a combination thereof. The mobile device 1802 also includes storage 1812, which may include one or more storage devices configured to store data related to the generation and presentation of virtual representations of EGMs, such as EGM data and a profile store. The EGM data may include, for example, initial packages of EGM data 1814 stored locally on the mobile device 1802 from which virtual representations of EGMs can be generated. Profile store 1816 may be configured to store predefined virtual representations of EGMs or sets of EGMs as described above.

Memory 1810 may include an augmented reality module 1818 configured to blend virtual content into a real-world environment. In some embodiments, augmented reality module 1818 may include functionality to identify geometric characteristics of a real-world environment in which the mobile device is situated. For example, the augmented reality module may obtain image data from a camera 1820 and/or other sensor data from sensor(s) 1822 of the mobile device to identify physical characteristics of the real-world environment, such as physical boundaries, planes, lighting, temperature, and the like. As such, sensor(s) may include motion sensors, accelerometers, location sensors such as GPS, gyroscopes, ambient light sensors, LiDAR, depth sensors, and the like. Further, camera may include one or more cameras and may include an image camera, a depth camera, or a combination thereof.

EGM virtualization application 1824 may include computer code executable by the processor(s) to generate virtual representations of one or more EGMs. The EGM virtualization app 1824 may include functionality to generate a user interface which may be presented on a display of the mobile device and may include a set of user-selectable components corresponding to one or more wagering games. For example, a user can select a particular game for which an EGM is to be built. As described above, the user interface may be configured to present options for configurations of EGMs. In some embodiments, the configurations may be provided from a content management system 1826 of a content management server 1804. The content management system (CMS) 1826 may be a "headless CMS" provided by memory 1838 of the content management server 1804, and may provide an interface for providing EGM data 1828 from network storage 1830, for example in the content management server 1804, to the mobile device 1802, as well as gaming devices A-N (1806A-1806N). As such, the configurations provided to the user correspond to a game that is implementable on a real-world electronic gaming machine. This is further illustrated by gaming devices A-N (1806A-1806N) being communicably connected to gaming servers 1832 which can be used to generate game outcomes, for example using an RNG.

In some embodiments, the EGM virtualization app 1824 can determine a selection of a subset of user selectable components from the user interface that correspond to an EGM configuration. As such, the EGM virtualization app 1824 can generate the virtual representation of the EGM in accordance with the selected configuration. Further, the virtual representation may be generated based on real-world specifications of real-world EGMs. For example, a CAD model of a real-world EGM may be utilized to define physical characteristics for a virtual representation of an EGM.

The AR module 1818 may be further configured to present the virtual representation of the EGM in an augmented reality environment such that the virtual representation is blended into a view of a real-world environment. For example, the virtual representation can be rendered such that its appearance is affected by real-world characteristics of the real-world environment. For example, lighting in the real-world environment may be detected by the ambient light sensor and used to render the virtual representation to reflect the real-world lighting. The virtual representation may be blended in, for example, by rendering an image of the real-world environment on which the virtual representation is placed in accordance with user input. As another example, the virtual representation may be presented on a display 1834 in accordance with a placement such that the virtual representation is overlaid on a view of the real-world environment in a pass-through display in accordance with the received placement. Thus, the presentation of the virtual representation of the EGM may be based on content from the EGM data 1814 of the mobile device 1802 and/or content management server 1804, as well as environmental factors of the physical environment as determined based on sensor data. In some embodiments, the EGM virtualization app is configured to map media received from the content management system onto a geometry of the virtual representation of the EGM. As such, the media presented on the virtual representation is consistent with media presented on real-world playable gaming devices.

In some embodiments, the EGM virtualization app 1824 may include functionality to determine whether a real-world version of a virtual representation of an EGM generated based on user input would fit in a physical environment. In some embodiments, the AR module 1818 may detect one or more boundaries, such as planes, in a physical environment in which the mobile device is located. The AR Module 1818 and/or the EGM virtualization app 1824 may determine, based on the physical characteristics of the physical environment and the geometric characteristics of an EGM represented by a virtual representation of an EGM whether a potential collision may occur. The potential collision may be detected, for example, if the boundaries of the virtual representation of the EGM intersect the boundaries of the physical environment based on the placement of the virtual representation of the EGM in the augmented reality environment. In some embodiments, the AR module 1818 may include the capability of presenting a visual indicator to identify a detected boundary in the physical environment. Further, the AR module 1818 and/or the EGM virtualization app 1824 may cause the virtual representation of the EGM to be rendered in a particular manner if a potential collision is detected, thereby improving the user interface by indicating to a user contextual information regarding the size of the EGM and whether a physical EGM matching the configuration of the virtual representation would fit in the physical environment.

Further, in some embodiments, multiple virtual representations of EGMs may be generated, for example in the form of a virtual banked set of EGMs, or separate EGMs and/or banks of EGMs. In this embodiment, the user interface of the EGM virtualization app may be configured to determine, based on user input, a layout of the set of virtual EGMs. The particular layout as well as the individual EGMs may be stored in profile store 1816 of the storage 1812 of the mobile device 1802 in association with a particular project and/or portfolio. For example, a spatial relationship between the multiple virtual EGMs may be stored for playback.

In some embodiments, the EGM virtualization app 1824 may additionally be configured to provide a presentation interface. The presentation interface may include user input components from which a user can organize virtual representations of EGMs or sets of EGMs for later playback. The playback may be performed, for example, in a linear manner based on an ordering of the virtual components as determined from the user input.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A non-transitory computer readable medium comprising computer readable code executable by one or more processors to:
obtain a virtual representation of an electronic gaming machine associated with real-world dimensions of the electronic gaming machine;
receive a buffer distance selection from a user for the virtual representation of the electronic gaming machine;
obtain sensor data for a real-world environment in which the virtual representation is to be presented;
detect one or more surfaces in the real-world environment based on the sensor data;
identify a region along a floor surface of the one or more surfaces surrounding the virtual representation of the electronic gaming machine based on the buffer distance selection and the real-world dimensions of the electronic gaming machine;
determine that the electronic gaming machine fits within the real-world environment in accordance with the real-world dimensions and the detected one or more surfaces and the buffer distance selection; and
present the virtual representation of the electronic gaming machine and a visual representation of the buffer distance selection in a mixed reality environment such that the virtual representation of the electronic gaming machine and the visual representation of the buffer distance selection is blended into a view of a real-world environment along the one or more surfaces in accordance with the determination that the electronic gaming machine fits within the real-world environment.

2. The non-transitory computer readable medium of claim 1, further comprising computer readable code to:
determine geometric characteristics for a real-world electronic gaming machine corresponding to the virtual representation of the electronic gaming machine;
identify one or more boundaries in the real-world environment; and
in accordance with a determination that the geometric characteristics of the real-world electronic gaming machine collide with at least one of the one or more boundaries of the real-world environment, present a visual indicator of the determination.

3. The non-transitory computer readable medium of claim 2, further comprising computer readable code to:
receive, via user input, a placement of the virtual representation of the electronic gaming machine within the real-world environment,
wherein the determination that the geometric characteristics of the real-world electronic gaming machine collide with at least one of the one or more boundaries is further determined based on the placement of the virtual representation of the electronic gaming system within the real-world environment.

4. The non-transitory computer readable medium of claim 2, wherein the computer readable code to identify one or more boundaries in the real-world environment comprises computer readable code to:
generate a geometric representation of the real-world environment based on the sensor data.

5. The non-transitory computer readable medium of claim 1, further comprising computer readable code to:
determine a buffer distance surrounding the virtual representation of the electronic gaming machine based on the buffer distance selection;
identify a region along a floor surface of the one or more surfaces surrounding the virtual representation of the electronic gaming machine based on the buffer distance; and
present the region along the floor surface using a visual treatment indicating the buffer distance.

6. The non-transitory computer readable medium of claim 5, further comprising computer readable code to:

receive a request for placement of a virtual representation of an accessory object for the virtual representation of the electronic gaming machine on the floor surface; and further identify the region along the floor surface based on the placement of the virtual representation of the accessory object.

7. The non-transitory computer readable medium of claim 5, wherein the computer readable code to determine a buffer distance comprises computer readable code to:

display a user interface component comprising selectable options for a plurality of buffer distances, wherein the buffer distance is determined based on a received user selection.

8. A method, comprising:

obtaining a virtual representation of an electronic gaming machine associated with real-world dimensions of the electronic gaming machine;

receiving a buffer distance selection from a user for the virtual representation of the electronic gaming machine;

obtaining sensor data for a real-world environment in which the virtual representation is to be presented;

detecting one or more surfaces in the real-world environment based on the sensor data;

identify a region along a floor surface of the one or more surfaces surrounding the virtual representation of the electronic gaming machine based on the buffer distance selection and the real-world dimensions of the electronic gaming machine;

determining that the electronic gaming machine fits within the real-world environment in accordance with the real-world dimensions and the detected one or more surfaces and the buffer distance selection; and presenting the virtual representation of the electronic gaming machine and a visual representation of the buffer distance selection in a mixed reality environment such that the virtual representation of the electronic gaming machine and the visual representation of the buffer distance selection is blended into a view of a real-world environment along the one or more surfaces in accordance with the determination that the electronic gaming machine fits within the real-world environment.

9. The method of claim 8, further comprising:

determining geometric characteristics for a real-world electronic gaming machine corresponding to the virtual representation of the electronic gaming machine;

identifying one or more boundaries in the real-world environment; and in accordance with a determination that the geometric characteristics of the real-world electronic gaming machine collide with at least one of the one or more boundaries of the real-world environment, presenting a visual indicator of the determination.

10. The method of claim 9, further comprising:

receiving, via user input, a placement of the virtual representation of the electronic gaming machine within the real-world environment, wherein the determination that the geometric characteristics of the real-world electronic gaming machine collide with at least one of the one or more boundaries is further determined based on the placement of the virtual representation of the electronic gaming system within the real-world environment.

11. The method of claim 9, wherein identifying one or more boundaries in the real-world environment comprises:

generating a geometric representation of the real-world environment based on the sensor data.

12. The method of claim 8, further comprising:

determining a buffer distance surrounding the virtual representation of the electronic gaming machine based on the buffer distance selection;

identifying a region along a floor surface of the one or more surfaces surrounding the virtual representation of the electronic gaming machine based on the buffer distance; and presenting the region along the floor surface using a visual treatment indicating the buffer distance.

13. The method of claim 12, further comprising:

receiving a request for placement of a virtual representation of an accessory object for the virtual representation of the electronic gaming machine on the floor surface; and further identifying the region along the floor surface based on the placement of the virtual representation of the accessory object.

14. The method of claim 12, wherein determining a buffer distance comprises:

displaying a user interface component comprising selectable options for a plurality of buffer distances, wherein the buffer distance is determined based on a received user selection.

15. A system comprising:

one or more processors; and one or more computer readable media comprising computer readable code executable by one or more processors to:

obtain a virtual representation of an electronic gaming machine associated with real-world dimensions of the electronic gaming machine;

receive a buffer distance selection from a user for the virtual representation of the electronic gaming machine;

obtain sensor data for a real-world environment in which the virtual representation is to be presented;

detect one or more surfaces in the real-world environment based on the sensor data;

identify a region along a floor surface of the one or more surfaces surrounding the virtual representation of the electronic gaming machine based on the buffer distance selection and the real-world dimensions of the electronic gaming machine;

determine that the electronic gaming machine fits within the real-world environment in accordance with the real-world dimensions and the detected one or more surfaces and the buffer distance selection; and present the virtual representation of the electronic gaming machine and a visual representation of the buffer distance selection in a mixed reality environment such that the virtual representation of the electronic gaming machine and the visual representation of the buffer distance selection is blended into a view of a real-world environment along the one or more surfaces in accordance with the determination that the electronic gaming machine fits within the real-world environment.

16. The system of claim 15, further comprising computer readable code to:

determine geometric characteristics for a real-world electronic gaming machine corresponding to the virtual representation of the electronic gaming machine;

identify one or more boundaries in the real-world environment; and in accordance with a determination that the geometric characteristics of the real-world electronic gaming machine collide with at least one of the one or more boundaries of the real-world environment, present a visual indicator of the determination.

17. The system of claim 16, further comprising computer readable code to:

receive, via user input, a placement of the virtual representation of the electronic gaming machine within the real-world environment, wherein the determination that the geometric characteristics of the real-world electronic gaming machine collide with at least one of the one or more boundaries is further determined based on the placement of the virtual representation of the electronic gaming system within the real-world environment.

18. The system of claim 16, wherein the computer readable code to identify one or more boundaries in the real-world environment comprises computer readable code to:

generate a geometric representation of the real-world environment based on the sensor data.

19. The system of claim 15, further comprising computer readable code to:

determine a buffer distance surrounding the virtual representation of the electronic gaming machine based on the buffer distance selection;

identify a region along a floor surface of the one or more surfaces surrounding the virtual representation of the electronic gaming machine based on the buffer distance; and present the region along the floor surface using a visual treatment indicating the buffer distance.

20. The system of claim 19, further comprising computer readable code to:

receive a request for placement of a virtual representation of an accessory object for the virtual representation of the electronic gaming machine on the floor surface; and further identify the region along the floor surface based on the placement of the virtual representation of the accessory object.

* * * * *